(12) United States Patent
Yokota et al.

(10) Patent No.: US 8,192,059 B2
(45) Date of Patent: Jun. 5, 2012

(54) ILLUMINANT DEVICE AND LAMP CLIP

(75) Inventors: Masashi Yokota, Suzuka (JP); Tsutomu Tsuji, Tsu (JP); Takaharu Kikuchi, Tsu (JP); Masaki Okazaki, Tsu (JP); Hirotomo Onozaki, Suzuka (JP); Kouichi Fujiwara, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 692 days.

(21) Appl. No.: 12/307,685

(22) PCT Filed: Jul. 6, 2007

(86) PCT No.: PCT/JP2007/063552
§ 371 (c)(1),
(2), (4) Date: Jan. 6, 2009

(87) PCT Pub. No.: WO2008/004655
PCT Pub. Date: Jan. 10, 2008

(65) Prior Publication Data
US 2009/0323307 A1    Dec. 31, 2009

(30) Foreign Application Priority Data

Jul. 7, 2006  (JP) .................. 2006-188429
Oct. 17, 2006 (JP) .................. 2006-282777
Jul. 3, 2007  (JP) .................. 2007-175364

(51) Int. Cl.
F21V 21/00       (2006.01)

(52) U.S. Cl. .............. 362/396; 362/217.09; 362/217.17; 362/225

(58) Field of Classification Search ............. 362/217.01, 362/220, 217.08, 217.09, 217.12, 217.13, 362/217.16, 217.17, 225, 260, 396
See application file for complete search history.

(56) References Cited

U.S. PATENT DOCUMENTS

| | | | |
|---|---|---|---|
| 7,798,671 B2 * | 9/2010 | Ota et al. ............. | 362/260 |
| 2005/0281037 A1 | 12/2005 | Murakami et al. | |
| 2006/0158905 A1 * | 7/2006 | Lai et al. ............. | 362/634 |
| 2006/0268542 A1 * | 11/2006 | Chen et al. ............. | 362/225 |

FOREIGN PATENT DOCUMENTS

| | | |
|---|---|---|
| CN | 2288541 Y | 8/1998 |
| JP | 6-75216 A | 3/1994 |
| JP | 2001-210126 A | 8/2001 |
| JP | 2005-251437 A | 9/2005 |
| JP | 2006-3732 A | 1/2006 |
| JP | 2006-114445 A | 4/2006 |

* cited by examiner

Primary Examiner — Y My Quach Lee
(74) Attorney, Agent, or Firm — Birch, Stewart, Kolasch & Birch, LLP

(57) ABSTRACT

Indexes indicative of the locations of lamp clips are formed on a chassis where lamps are juxtaposed with different juxtaposition pitches. The lamp clips comprise: plate-like bases; holding portions, which are provided at one face of the bases, for holding the lamps; and markers corresponding to the indexes.

9 Claims, 22 Drawing Sheets

F I G. 8
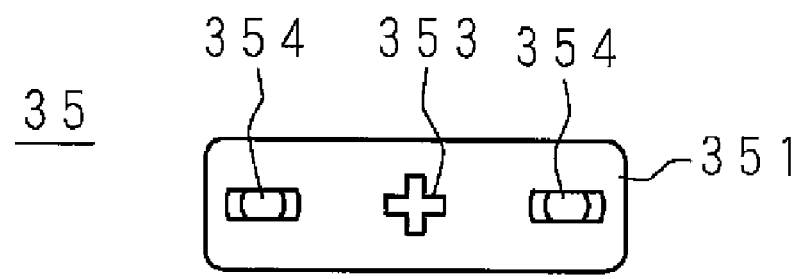

F I G. 17
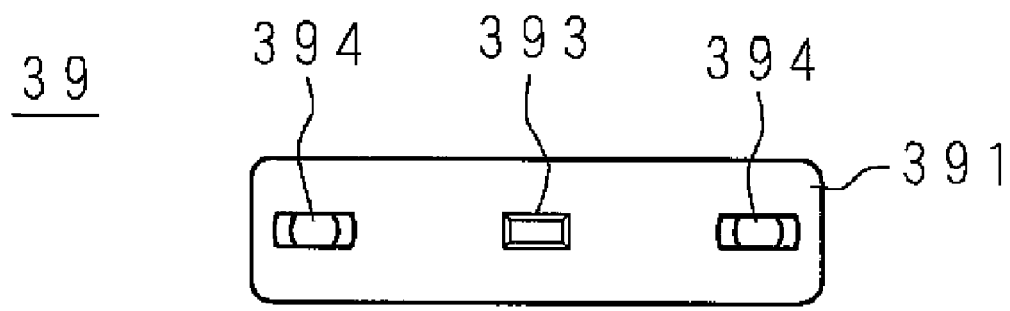

(a)

(b)

ILLUMINANT DEVICE AND LAMP CLIP

This application is the national phase under 35 U.S.C. §371 of PCT International Application No. PCT/JP2007/063552 which has an International filing date of Jul. 6, 2007 and designated the United States of America.

BACKGROUND

1. Technical Field

The present invention relates to an illuminant device comprising lamp clips for holding lamps and to the lamp clip.

2. Description of Related Art

A liquid crystal display is made by lamination of a liquid crystal display panel and an illuminant device in which a plurality of rod-shaped lamps are juxtaposed on a chassis substantially parallel to each other with both end parts thereof being held respectively. Here, both end parts of the lamps are fixed by lamp holders which are disposed at both lateral parts of an illuminant devices for example.

In recent years, with the increase in the size of a liquid crystal display, the number of lamps in an illuminant device tends to increase and each lamp tends to get longer and thinner.

Regarding the increase in the number of lamps, an illuminant device, in which lamps are arranged densely at a central side in a lamp juxtaposition direction and thinly at both end sides in the lamp juxtaposition direction, has been proposed with the aim of maintaining required luminance while depressing uneven luminance of an illuminant device so as to reduce the number of lamps (see Japanese Patent Application Laid-Open No. H6-75216 (1994)).

In the above illuminant device, a plurality of lamps are juxtaposed in such a manner that a pitch gradually increases from a central part in a juxtaposition direction toward both end parts in the juxtaposition direction. Accordingly, luminance is the highest in a central part of a screen of a liquid crystal display panel and gradually lowers toward both end parts of the screen. By decreasing the number of lamps as described above, low power consumption, miniaturization, thinning and weight saving are achieved.

On the other hand, regarding elongation of a lamp, an illuminant device, which is provided with not only lamp holders for holding both end parts of lamps but also lamp clips for holding at least one point or two points of a central part of lamps, has been proposed with the aim of holding elongated lamps reliably and maintaining the performance, quality or the like of an illuminant device (see Japanese Patent Application Laid-Open No. 2001-210126).

In the meantime, when one lamp clip having one holding portion for holding one lamp holds one lamp, there is a problem that the number of lamp clips increases and the number of working steps for holding lamps with lamp clips increases.

In order to solve the above problem, disclosed in Japanese Patent Application Laid-Open No. 2001-210126 is a lamp clip which integrally has a plurality of holding portions for respectively holding a plurality of adjacent lamps.

When such a lamp clip is used, it is possible to hold a plurality of adjacent lamps simultaneously and it is therefore possible to decrease the number of lamp clips and the number of working steps related to lamp clips. In particular, when four lamps are juxtaposed, for example, it is only necessary to prepare two lamp clips, each of which integrally has two holding portions for respectively holding two adjacent lamps, and perform a holding operation of a lamp two times.

Especially, the lamp clip disclosed in Japanese Patent Application Laid-Open No. 2001-210126 is formed in a circular notch grip shape having an opening at a part, made of a flexible transparent member and integrally molded for one tube or multi tubes, so that a lamp can be protected, a high degree of positional accuracy of lamp alignment can be ensured, uneven luminance at information display surface can be prevented, and the effect of the shadow of a lamp holder on luminance lowering or uneven luminance of information display surface can be prevented by employing transparent material.

In the meantime, when a plurality of lamps are juxtaposed with different pitches as disclosed in Japanese Patent Application Laid-Open No. H6-75216 (1994) and the lamps are held by lamp clips disclosed in Japanese Patent Application Laid-Open No. 2001-210126, a possible structure is that all lamp clips are located to have a staggered arrangement, with one lamp clip corresponding to one lamp. The staggered arrangement here means that lamp clips adjacent in the juxtaposition direction of lamps are arranged in different positions in the longitudinal direction of the lamps. The same arrangement will be hereinafter referred to as a staggered arrangement.

However, such a structure has a problem that the number of lamp clips increases and the number of working steps for holding lamps with lamp clips increases.

Therefore, a possible structure is that all lamp clips are located to have a staggered arrangement, with one lamp clip corresponding to two lamps.

In this case, since the juxtaposition pitch of lamps is not constant, a wide variety of lamp clips having different separation distances of two holding portions must be prepared in correspondence to a wide variety of juxtaposition pitches.

SUMMARY

However, since a difference in juxtaposition pitches of lamps is generally small (approximately 0.1 mm -5.0 mm, for example), a difference in separation distances of two holding portions of different types of lamp clips is also small. Accordingly, it is difficult for the operator to differentiate the type of a lamp clip especially during a production operation of an illuminant device.

Moreover, even when the type of a lamp clip is differentiated accurately, it is difficult for the operator to differentiate two lamps which should be held by said lamp clip, i.e., two lamps which have a juxtaposition pitch corresponding to the separation distance between two holding portions of said lamp clip.

The present invention has been made in view of such a situation, and the main object thereof is to provide: an illuminant device in which an index indicative of the location of each lamp clip is formed at a mounting plate, where lamps are located, to have a shape different for each lamp clip and a marker corresponding to the index is formed at each lamp clip, so that a lamp clip can be disposed easily at an accurate position to hold a lamp; and a lamp clip.

Another object of the present invention is to provide an illuminant device with which luminance that is less affected by an index can be obtained or luminance unaffected by an index can be obtained.

Another object of the present invention is to provide an illuminant device in which a recess or a hole corresponding to an index indicative of its own location is provided at a plate-like base having one face where lamp holding portions are juxtaposed, so that a lamp clip can be disposed further easily to hold a lamp.

Another object of the present invention is to provide an illuminant device in which an index is provided at a position facing a lamp or a position facing a lamp clip, so that lowering of luminance due to an index can be depressed and luminance which is less affected by an index can be obtained.

Another object of the present invention is to provide an illuminant device in which a convex part (or a concave part) corresponding to a concave part (or a convex part), which is an index indicative of its own location, is formed at a base of a lamp clip, so that a lamp clip can be disposed further easily to hold a lamp.

Yet another object of the present invention is to provide an illuminant device in which a marker corresponding to a convex part (or a concave part) formed at one face of a base of a lamp clip is formed at the other face, so that it is possible to differentiate between lamp clips of different types further easily.

Yet another object of the present invention is to provide an illuminant device in which a marker is provided at one face of a base of a lamp clip so that it is possible to differentiate between lamp clips of different types easily, or an illuminant device in which a marker is provided at a columnar projection formed to project from a base so that the shape of a lamp clip having a marker can be simplified.

An illuminant device according to the present invention is an illuminant device, in which at least four rod-shaped lamps are juxtaposed on a mounting plate where said lamps are attached with different pitches and a plurality of types of lamp clips having a plurality of holding portions for holding a plurality of adjacent lamps are provided on the mounting plate, characterized in that an index indicative of the location of each lamp clip is formed at the mounting plate to have a shape different for each lamp clip, and a marker corresponding to the index is formed at each lamp clip.

Moreover, an illuminant device according to the present invention is characterized in that the index has a size which makes the luminance of emission of the lamp approximate to the luminance of the periphery of the index.

Moreover, an illuminant device according to the present invention is characterized in that each of the lamp clips comprises a plate-like base having one face where the holding portions are juxtaposed, and the marker is a recess or a hole which pierces from one face of the base to the other face.

Moreover, an illuminant device according to the present invention is characterized in that the index is at a position facing the lamp.

Moreover, an illuminant device according to the present invention is characterized in that the index is a concave part (or a convex part), each of the lamp clips comprises a plate-like base having one face where the holding portions are juxtaposed, and the marker is a convex part (or a concave part) formed at the other face of the base in correspondence to the concave part (or the convex part).

Moreover, an illuminant device according to the present invention is characterized in that a marker corresponding to the convex part (or the concave part) is formed at the one face.

Moreover, an illuminant device according to the present invention is characterized in that each of the of lamp clips comprises a plate-like base having one face where the holding portions are juxtaposed, and the marker is formed at the one face.

Moreover, an illuminant device according to the present invention is characterized in that the base has a columnar projection which is formed to project from a position between the holding portions, and the marker is provided at the columnar projection.

Moreover, an illuminant device according to the present invention is characterized in that the index is disposed at a position facing the base.

Moreover, a lamp clip according to the present invention is a lamp clip having a plurality of holding portions for holding a plurality of adjacent lamps, characterized in that a marker corresponding to an index formed at a position where the same is located is formed.

In the present invention, a marker is formed at a lamp clip in correspondence to an index, which is formed at a position where the same is located, of a plurality of types of indexes, which are formed at a mounting plate to indicate the location of each lamp clip, and therefore different markers respectively correspond to different types of indexes. That is, a lamp clip can be easily distinguished visually by using a marker formed at the lamp clip.

Moreover, since an index corresponding to a marker formed at a lamp clip is an index indicative of the location of said lamp clip, arrangement of the lamp clip can be easily recognized visually by using a marker formed at the lamp clip and an index formed at a mounting plate.

Since an index formed at a mounting plate has a size which makes the luminance of emission of the lamp approximate to the luminance of the periphery of the index, lowering of luminance due to an index can be made into a minute amount and luminance unaffected by an index can be obtained.

Moreover, since an index is at a position facing a lamp and is located behind a lamp, lowering of luminance due to an index can be made into a further minute amount and luminance unaffected by an index can be obtained.

In the present invention, a marker of a lamp clip is formed at a plate-like base having one face where holding portions are provided and said marker is a recess or a hole which pierces from one face of the base to the other face. That is, a lamp clip can be easily distinguished visually and/or tactually by using a marker formed at the lamp clip.

Since an index of a mounting plate is at a position facing the base of a lamp clip and is located behind the lamp clip, lowering of luminance due to an index can be depressed and luminance which is less affected by an index can be obtained.

Since a plurality of holding portions are juxtaposed at one face of the base, said one face is made to face the lamp side and the other face of the base is made to face the mounting plate side where the lamps are juxtaposed. Accordingly, an index formed at the mounting plate is visible through a recess or a hole formed at the lamp clip.

In the present invention, a concave part (or a convex part) is formed at the mounting plate as a plurality of types of indexes indicative of the location of each lamp clip.

Moreover, a marker of a lamp clip is formed at the other face of a plate-like base having one face where holding portions are provided and said marker is a convex part (or a concave part) corresponding to the concave part (or the convex part) formed at the mounting plate. That is, a lamp clip can be easily distinguished visually and/or tactually by using a marker formed at the lamp clip.

Since a plurality of holding portions are juxtaposed at one face of the base, said one face is made to face the lamp side and the other face of the base is made to face the mounting plate side where lamps are juxtaposed. Accordingly, a marker and an index can be made to correspond to each other easily by making a convex part (or a concave part) formed at the other face of the base of the lamp clip correspond to a concave part (or a convex part) formed at the mounting plate.

Here, a convex part (or a concave part) of a lamp clip and a concave part (or a convex part) of a mounting plate, which do not correspond to each other, do not correspond.

In the present invention, a holding portion and a marker corresponding to a convex part (or a concave part) formed at the other face of the base are formed at one face of the base of the lamp clip.

One face of the base where a plurality of holding portions are juxtaposed is made to face the lamp side and the other face of the base is made to face the mounting plate side where lamps are juxtaposed. That is, one face of the base of the lamp clip is a front face which is easy for the operator to look at or touch and the other face is a reverse face which is difficult to look at or touch.

That is, since a marker indicative of the type of a lamp clip is formed at the front face of the base of said lamp clip which is easy for the operator to check, it is possible to differentiate between different types of lamp clips further easily.

If a marker corresponding to a convex part (or a concave part) of the reverse face is not formed at the front face of the base, the operator has to check the reverse face side of the base each time and figure out the shape, color or the like of the type of a convex part (or a concave part) in order to differentiate between the types of lamp clips.

Moreover, since a marker is provided at a columnar member which is formed to project from a position between holding portions at the front face of the base, the shape of a lamp clip having a marker can be simplified.

With an illuminant device and a lamp clip of the present invention, the operator can easily distinguish a lamp clip visually by using a marker formed at the lamp clip. Accordingly, even when a difference in the separation distances of a plurality of holding portions of different types of lamp clips is small, the operator can differentiate between the types of lamp clips easily and the workability can be enhanced.

Moreover, since the location of a lamp clip can be easily recognized visually by using a marker formed at the lamp clip and an index formed at a mounting plate, a lamp clip can be located accurately.

Accordingly, even when, for example, a difference in juxtaposition pitches of lamps is small, the operator can easily differentiate between a plurality of lamps to be held by a lamp clip, i.e., a plurality of lamps having a juxtaposition pitch corresponding to the separation distance of a plurality of holding portions of a lamp clip, and the workability can be enhanced.

With an illuminant device of the present invention, the operator can reliably distinguish a lamp clip visually and/or tactually by using a marker formed at the lamp clip.

Moreover, a lamp clip can be located accurately by making a marker formed at the lamp clip and an index formed at a mounting plate correspond to each other. Furthermore, since an index is visible through a recess or a hole, whether a lamp clip is located accurately or not can be easily checked visually by checking correspondence between a recess or a hole and an index visually after arrangement of a lamp clip, for example.

With an illuminant device of the present invention, the operator can reliably distinguish a lamp clip visually and/or tactually by using a marker formed at the lamp clip.

Moreover, a lamp clip can be located accurately by making a convex part (or a concave part), which is a marker formed at the lamp clip, and a concave part (or a convex part), which is an index formed at a mounting plate, correspond to each other. Furthermore, since a convex part (or a concave part) of a lamp clip and a concave part (or a convex part) of a mounting plate, which correspond to each other, correspond and a convex part (or a concave part) of a lamp clip and a concave part (or a convex part) of a mounting plate, which do not correspond to each other, do not correspond, whether the parts correspond to each other or not can be checked further easily.

With an illuminant device of the present invention, the operator can easily distinguish a lamp clip visually and/or tactually by using a marker formed at a front face (the other face mentioned above) of the base of a lamp clip and said lamp clip can be located accurately. Moreover, since a marker is provided at a columnar member which is formed to project from a position between holding portions at the front face of the base, the shape of a lamp clip having a marker can be simplified and the cost can be reduced.

Since an index of a mounting plate is formed to have a size which makes the luminance of emission of the lamp approximate to the luminance of the periphery of the index, lowering of luminance due to an index can be made into a minute amount and luminance unaffected by an index can be obtained.

Moreover since an index is located behind a lamp, lowering of luminance due to an index can be made into a further minute amount and luminance unaffected by an index can be obtained.

Moreover, since an index is located behind a lamp clip, lowering of luminance due to an index can be depressed and luminance which is less affected by an index can be obtained.

The above and further objects and features will more fully be apparent from the following detailed description with accompanying drawings.

BRIEF DESCRIPTION OF THE DRAWINGS

FIG. 8 is a bottom view for showing the structure of a lamp clip provided in an illuminant device according to Embodiment 2 of the present invention FIG. 17 is a bottom view for showing the structure of another lamp clip provided in an illuminant device according to Embodiment 3 of the present invention

DETAILED DESCRIPTION

The following description will explain the present invention in detail with reference to the drawings illustrating some embodiments thereof.

Embodiment 1

Figure 1:
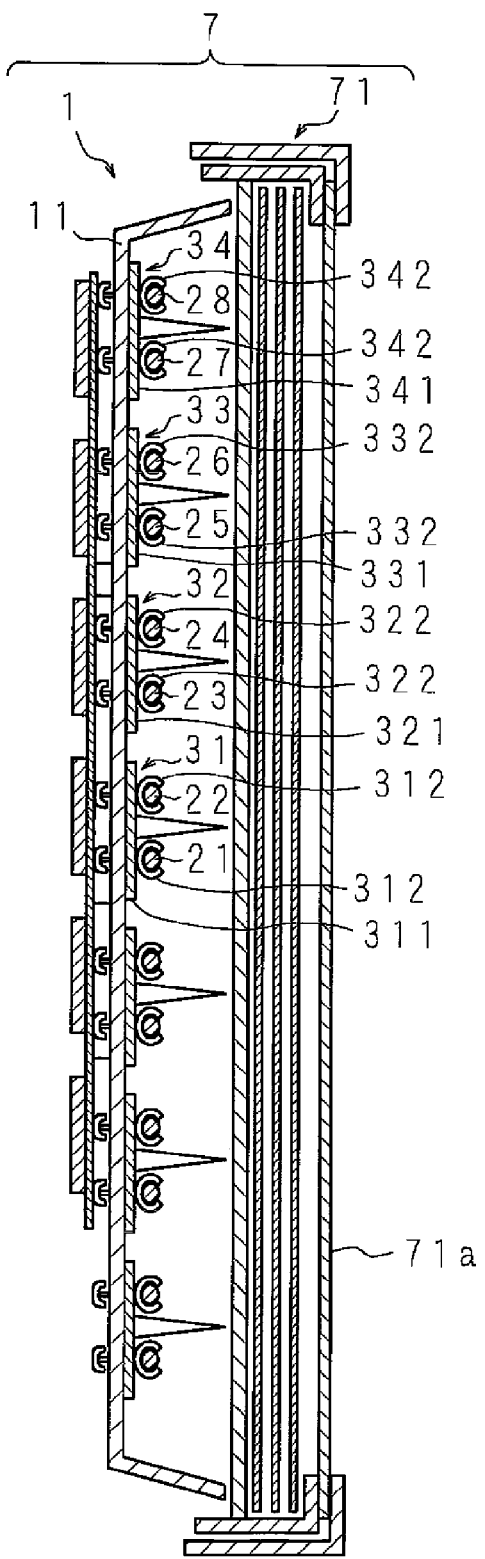
FIG. 1 is a schematic longitudinal sectional view of a liquid crystal display provided with an illuminant device according to Embodiment 1 of the present invention
Figure 2:
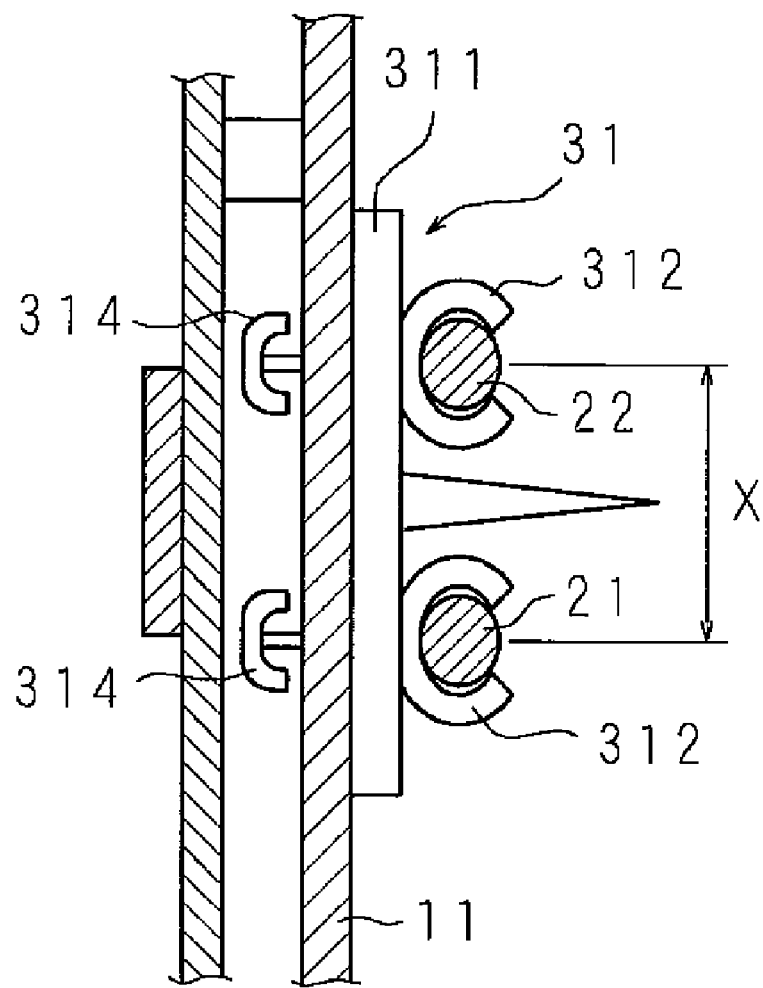
FIG. 2 is an enlarged longitudinal sectional view of a lamp clip part of an illuminant device according to Embodiment 1 of the present invention
Figure 3:
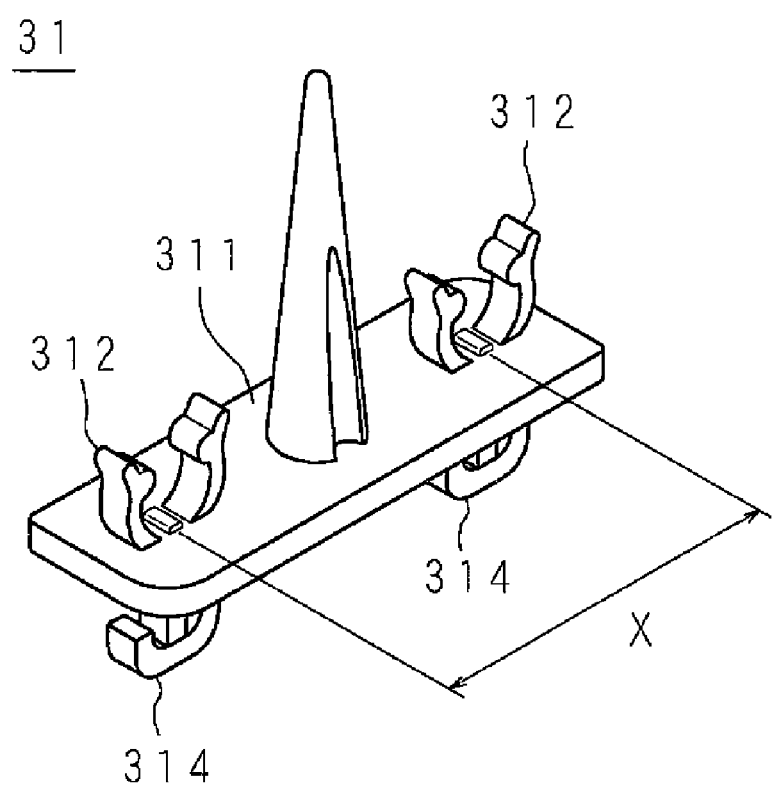
FIG. 3 is a perspective view for showing the structure of a lamp clip of an illuminant device according to Embodiment 1 of the present invention
Figure 4:
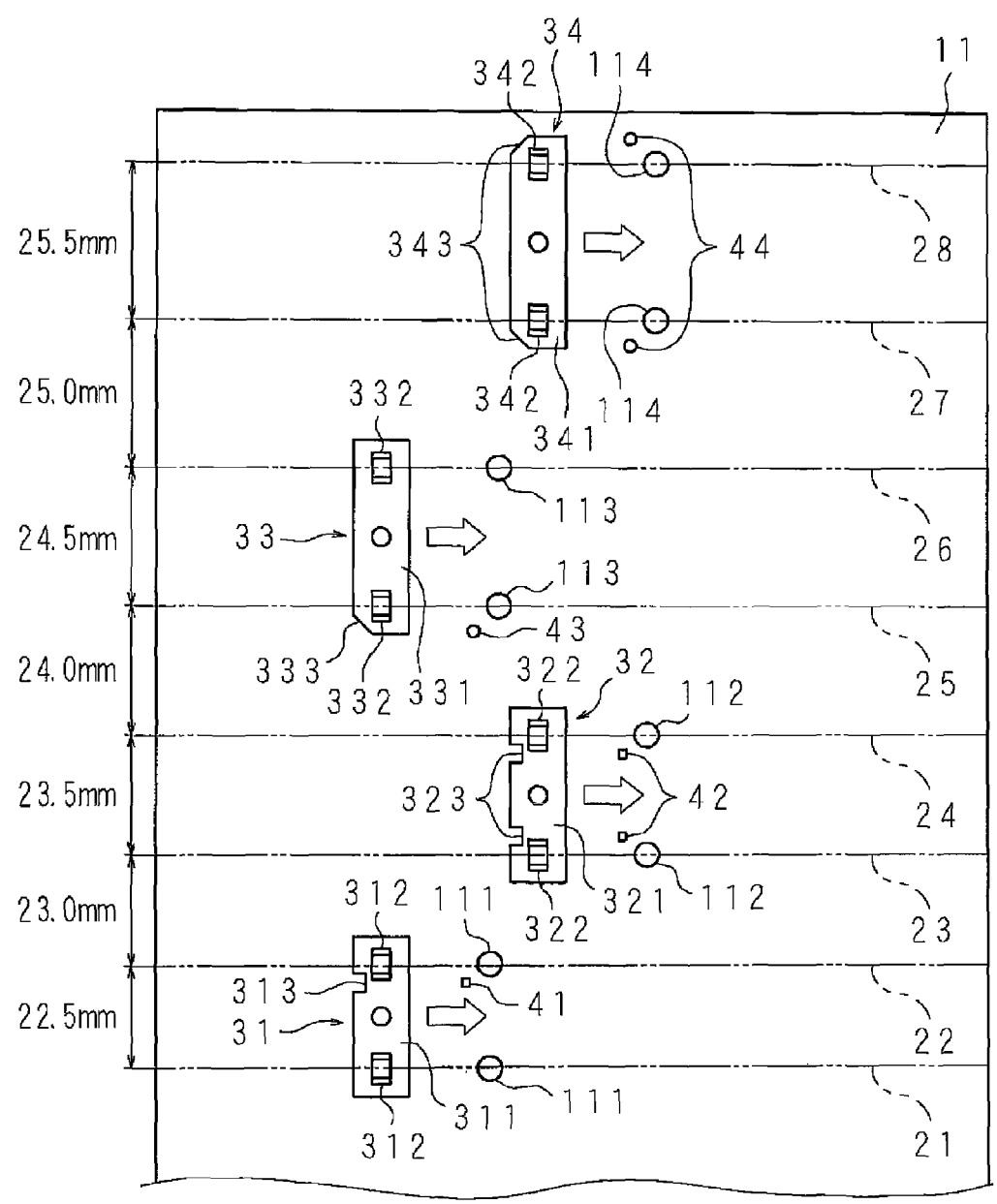
FIG. 4 is a front view of an upper part of an illuminant device for showing the arrangement procedure of lamp clips
Figure 5:
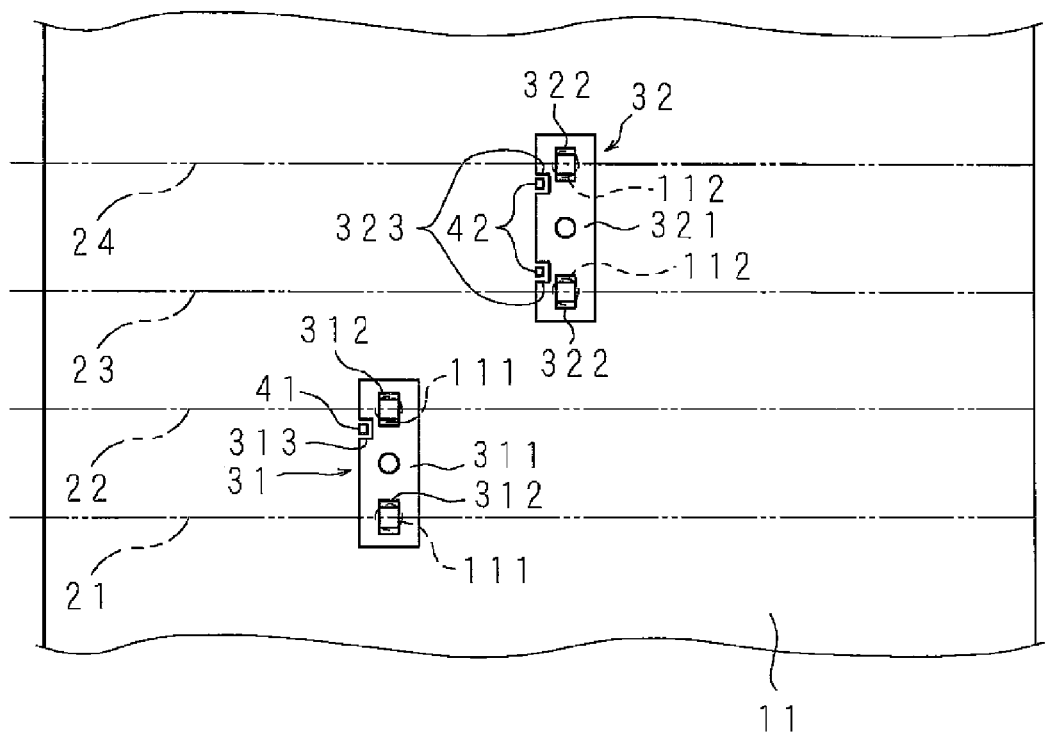
FIG. 5 is a partial schematic front view for showing a state where lamp clips of an illuminant device according to Embodiment 1 of the present invention is attached
Figure 6:
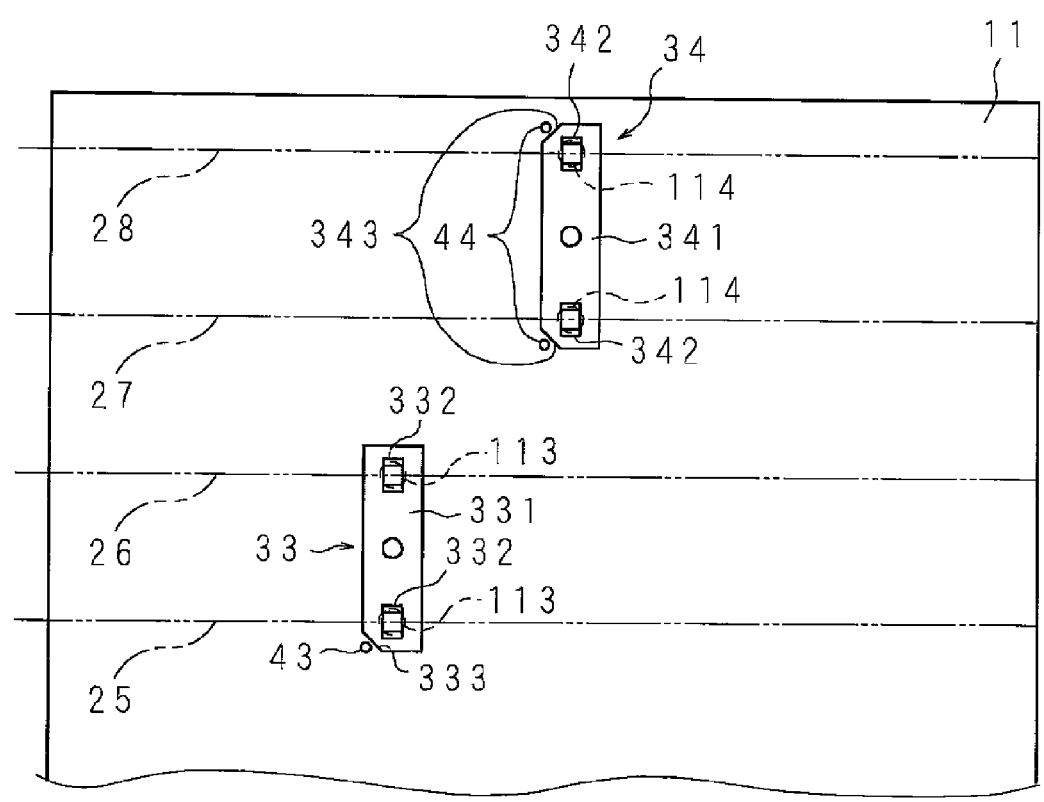
FIG. 6 is a partial schematic front view for showing a state where lamp clips of an illuminant device according to Embodiment 1 of the present invention is attached

FIG. 1 is a schematic longitudinal sectional view of a liquid crystal display 7 provided with an illuminant device 1 according to Embodiment 1 of the present invention, FIG. 2 is an enlarged longitudinal sectional view of a lamp clip 31 part of the illuminant device 1, FIG. 3 is a perspective view for showing the structure of the lamp clip 31, FIG. 4 is a front view of an upper part of the illuminant device 1 for showing the arrangement procedure of lamp clips 31, 32, 33 and 34, FIG. 5 is a partial schematic front view for showing a state where the lamp clips 31 and 32 are attached, and FIG. 6 is a partial schematic front view for showing a state where the lamp clips 33 and 34 are attached. In FIGS. 4 to 6, positions where lamps 21 to 28, which will be described later, are disposed are shown in long dashed double-short dashed line.

As shown in FIG. 1, an illuminant device 1 is used as a backlight device of a thin-shaped liquid crystal display 7 provided with a leg part, which is not illustrated, and is located behind a liquid crystal display panel 71 having a rectangular shape in a front view and having a display surface 71a on a front side thereof.

The illuminant device 1 in the present embodiment comprises a plurality of lamps including lamps 21 to 28 which are juxtaposed at a distance up and down. Since the arrangement of said lamps 21 to 28 is vertically symmetrical with respect to the center of a central part of the illuminant device 1 upward and downward, the following description will explain the lamps 21 to 28 disposed at the upper side of the illuminant device 1 and explanation of the lower side will be omitted.

The illuminant device I is provided with a chassis 11 which functions as a mounting plate where the lamps 21 to 28 are attached. The chassis 11 is made by disposing a reflecting sheet for reflecting light, which is not illustrated, on the inner surface of a metal member, which is molded to have a rectangular dish shape, or coating the inner surface of the metal member with paint which reflects light. Accordingly, the chassis 11 has a reflecting layer made of a reflecting sheet or the like and has a function of reflecting light emitted by the lamps 21 to 28 to the liquid crystal display panel 71 side.

Description of the reflecting layer such as a reflecting sheet of the chassis 11 will be omitted in the following description. At the chassis 11, lock holes 111 to 114 for attaching lamp clips 31 to 34 to the chassis 11 are formed as will be described later.

Each of the lamps 21 to 28 has an elongate rod shape or, in particular, a long and small-diameter annular shape (having a length of tens of centimeters or more and an inside diameter of 5 mm or less) and have substantially the same shape with each other. Moreover, each of the lamps 21 to 28 can be curved by up to approximately 0.5 mm for the length of 1200 mm.

As shown in FIG. 4, the lamps 21 to 28 are juxtaposed in this order parallel to each other in such a manner that the pitch increases from a central part of the illuminant device 1 upward and downward to an upper end part thereof.

In particular, the lamp 21 is disposed at a central part of the illuminant device 1 upward and downward, the lamp 22 is disposed above the lamp 21 with a pitch of 22.5 mm, the lamp 23 is disposed above the lamp 22 with a pitch of 23.0 mm, and the lamp 24 is disposed above the lamp 23 with a pitch of 23.5 mm.

Similarly, the lamp 25 (26, 27, 28) is disposed above the lamp 24 (25, 26, 27) with a pitch of 24.0 (24.5, 25.0, 25.5) mm.

The pitch of the lamps 21 to 28 corresponds to the separation distance between long dashed double-short dashed lines shown in FIGS. 4 to 6.

By disposing the lamps 21 to 28 densely at a central part upward and downward and thinly at end parts upward and downward as described above, luminance is the highest in a central part of a screen of the liquid crystal display panel 71 upward and downward and luminance of a screen gradually lowers from a central part upward and downward toward end parts upward and downward. In this case, sufficient luminance is ensured while uneven luminance of the liquid crystal display panel 71 is depressed and, furthermore, the number of lamps composing the illuminant device 1 decreases.

Both end parts of the respective lamps 21 to 28 are held by lamp holders, which are not illustrated, attached to the chassis 11.

Central parts of the lamps 21 and 22 are held by one or two lamp clip(s) 31. Similarly, central parts of the lamps 23 and 24, the lamps 25 and 26, and the lamps 27 and 28 are respectively held by one or two lamp clip(s) 32, 33 and 34. Illustrated in FIG. 4 is the procedure for holding one position of a central part of the respective lamps 21 to 28 with a total of four lamp clips 31, 32, 33 and 34.

Since the respective lamp clips 31 to 34 have the same shape, the following description will mainly explain the shape of the lamp clip 31 and explanation of the other lamp clips 32 to 34 will be omitted.

As shown in FIGS. 1 to 4, the lamp clip 31 comprises a rectangular plate-like base 311, two holding portions 312 and 312 in a circular notch grip shape having an opening at a part are integrally formed to project from one face (front face) at both sides in the longitudinal direction of the base 311, and locking portions 314 and 314 are integrally formed to project from the other face (reverse face) at both sides in the longitudinal direction of the base 311.

Such a lamp clip 31 is made by integral molding using transparent and colorless, or white acrylic resin, for example. When the lamp clip 31 is transparent and colorless, lowering of luminance of the liquid crystal display panel 71 due to the shadow of the lamp clip 31 can be depressed and, when the lamp clip 31 is white, reflection of the lamp clip 31 body at the liquid crystal display panel 71 can be depressed. Moreover, integral molding using synthetic resin enables easy manufacturing.

Each holding portion 312 is formed to have a proper thickness so that the holding portion 312 becomes flexible. The inner dimension of the holding portion 312 is slightly smaller than the outside diameter of the lamp 21. The lamps 21 and 22 are pushed into the holding portions 312 and 312 through the openings of the holding portions 312 and 312, with both lateral parts of the openings of the holding portions 312 and 312 bending outward. The lamps 21 and 22 are gripped by the holding portions 312 and 312 when the lamps 21 and 22 are held between both lateral parts of the openings of the holding portions 312 and 312 by elastic restoring force after insertion of the lamps 21 and 22 into the holding portions 312 and 312.

The holding portions 312 and 312 are juxtaposed at a distance of X mm in the longitudinal direction of the base 311. Regarding the lamp clip 31 a separation distance X of the holding portions 312 and 312 is 22.5 mm. Said distance is substantially equal to the pitch of the lamps 21 and 22.

Here, as in the lamp clip 31, the lamp clip 32 comprises a base 321 corresponding to the base 311, holding portions 322 and 322 corresponding to the holding portions 312 and 312, and locking portions corresponding to the locking portions 314 and 314 as shown in FIGS. 1 and 4. Here, regarding the lamp clip 32, a separation distance X of the holding portions 322 and 322 is 23.5 mm. Said distance is substantially equal to the pitch of the lamps 23 and 24.

Similarly, the lamp clip 33 (34) comprises a base 331 (341) corresponding to the base 311, holding portions 332 and 332 (342 and 342) corresponding to the holding portions 312 and 312, and locking portions corresponding to the locking portions 314 and 314. Here, regarding the lamp clip 33 (34), a separation distance X of the holding portions 332 and 332 (342 and 342) is 24.5 (25.5) mm. Said distance is substantially equal to the pitch of the lamps 25 and 26 (27 and 28).

As shown in FIGS. 2 and 3, the locking portions 314 and 314 are disposed substantially right behind the holding portions 312 and 312 and have an arrow-like shape, wherein the rear anchor side of the arrow is continuous with the base 311 and the head side of the arrow is flexible.

The lamp clip 31 is attached to the chassis 11 when the locking portions 314 and 314 are inserted into lock holes 111 and 111 (FIGS. 4 and 5) formed at the chassis 11 from inside of the chassis 11 to outside. In this case, the locking portions 314 and 314 are locked at the chassis 11 when the head parts bend and become downsized during insertion into the lock holes 111 and 111 and the head parts of the locking portions 314 and 314 restore elastically after completion of insertion.

The respective lockholes 111, 111, 112, 112, 113, 113, 114 and 114 of the chassis 11 to which the lamp clips 31, 32, 33 and 34 should be attached are formed at positions corresponding to the back of the lamps 21 to 28, that is to say, positions facing the lamps 21 to 28 as shown in FIG. 4.

Moreover the lock holes 111 and 111, the lock holes 112 and 112, the lock holes 113 and 113, and the lock holes 114 and 114 are formed to have a staggered arrangement in the juxtaposition direction of the lamps 21 to 28. Accordingly, the lamp clip 31 for holding the lamps 21 and 22, the lamp clip 32 for holding the lamps 23 and 24, the lamp clip 33 for holding the lamps 25 and 26, and the lamp clip 34 for holding the lamps 27 and 28 are located to have a staggered arrangement.

In the meantime, a difference between the pitch of the lamps 21 and 22 and the pitch of the lamps 22 and 23 is 0.5 mm. Similarly, a difference between the pitch of the lamps 23 and 24 and the pitch of the lamps 24 and 25, . . . , a difference between the pitch of the lamps 26 and 27 and the pitch of the lamps 27 and 28 are respectively 0.5 mm.

Accordingly, a difference between a separation distance X of the holding portions 312 and 312 of the lamp clip 31 and a separation distance X of the holding portions 322 and 322 of the lamp clip 32, . . . , a distance between a separation distance X of the holding portions 332 and 332 of the lamp clip 33 and a separation distance X of the holding portions 342 and 342 of the lamp clip 34 are respectively 0.5 mm.

As a result, it is difficult for the operator to differentiate between the lamp clips 31 to 34 by using the separation distance X especially during a production operation of the illuminant device 1

Similarly, it is difficult to differentiate between the lamps 21 and 22 for which the lamp clip 31 should be located, the lamps 23 and 24 for which the lamp clip 32 should be located, . . . , the lamps 27 and 28 for which the lamp clip 34 should be located, by using the pitch of the lamps 21 to 28.

As shown in FIGS. 4 to 6, in the present embodiment, a marker 313 is formed at the base 311 of the lamp clip 31 and a marker 323 (333, 343) is formed at the base 321 (331, 341) of the lamp clip 32 (33, 34) in order to distinguish the lamp clips 31 to 34. The markers 313 to 343 are markers of types different from each other.

Moreover, an index 41 indicative of the location of the lamp clip 31 is formed at the chassis 11. Furthermore, an index 42 (43, 44) indicative of the location of the lamp clip 32 (33, 34) is formed at the chassis 11 and the respective indexes 41 to 44 are indexes of types different from each other.

The following description will first explain the indexes 41 to 44 further in detail.

The index 41 is a small rectangular index formed adjacent to a lock hole 111 which is formed at a position corresponding to the back of the lamp 22.

The index 42 is two small rectangular indexes formed adjacent to the lock holes 112 and 112 which are formed at positions corresponding to the back of the lamps 23 and 24.

The index 43 is a small circular index formed adjacent to a lock hole 113 which is formed at a position corresponding to the back of the lamp 25.

The index 44 is two small circular indexes formed adjacent to the lock holes 114 and 114 which are formed at positions corresponding to the back of the lamps 27 and 28.

The respective indexes 41, 42, 43 and 44 may be formed by manual drawing or printing with a printing machine on the chassis 11 using paint, or by boring a hole or a pore at the chassis 11, for example. Since the indexes have sufficiently small dimensions, lowering of a reflection function of the chassis 11 due to formation of the indexes 41, 42, 43 and 44 can be depressed.

Although recognition of an index by the operator becomes easier as an index becomes larger and reflectance becomes lower, an extremely large index and extremely low reflectance cause lowering of a reflection function of the chassis 11. Accordingly, the size of the index is limited. The degree of lowering of a reflection function varies with the juxtaposition pitch of the lamps and the distance from the chassis 11 to the lamps and liquid crystal display panel. Generally, when there is something which causes lowering of a reflection function on the chassis, luminance of the part lowers and the part seems like shadow when seen from the liquid crystal display panel side. Accordingly, lowering of a reflection function can be depressed by measuring the size or the like which can be recognized from outside of an optical device in the design phase and forming an index having a size smaller than said size or higher reflectance. Although the upper limit of the size of an index varies according to conditions as described above, it has been confirmed for one illuminant device that there is no problem as long as an index has a diameter of 2 mm and gray of 50%.

Moreover, judgment of the size and reflectance of an index can be also estimated computationally. For example, discuss whether an index having a diameter of 2 mm causes a problem or not, regarding an illuminant device having a juxtaposition pitch of lamps of 25 mm. It is conceivable that light inside the illuminant device diffuses so that the position of the lamp cannot be recognized. Since it is therefore conceivable that light diffuses within the range of 25 mm×25 mm, luminance lowers in comparison with the other region when said range includes a part having low reflectance. Since generally a recognizable luminance difference is approximately 1% from the Weber law or the like, it is conceivable that a luminance difference equal to or larger than approximately 1% is recognized as uneven luminance. Accordingly, it can be estimated that there is no problem when the area of an index to the area of the above region is equal to or smaller than 1%. There is no problem since the area of said region is 625 square millimeters (25×25), the area of an index is 3.14 square millimeters (1×1×3.14), and the ratio is 0.5%.

It should be noted that the indexes 41, 42, 43 and 44 may be set at positions facing the lamps 21 to 28 so that the indexes 41, 42, 43 and 44 are located behind the lamps 21 to 28. In this case, lowering of a reflection function of the chassis 11 due to formation of the indexes 41, 42, 43 and 44 is further depressed.

Next, the markers 313 to 343 will be explained further in detail.

The marker 313 is formed at one side part of four side parts of the base 311 of the lamp clip 31 so as to pierce from the front face of the base 311 to the reverse face and, in particular, is one rectangular notch part (recess). Said marker 313 is formed at a position corresponding to the index 41, which is to be located when the lamp clip 31 is accurately disposed at the chassis 11.

The marker 323 is formed at one side part of four side parts of the base 321 of the lamp clip 32 so as to pierce from the front face of the base 321 to the reverse face and, in particular, is two rectangular notch parts (recesses) juxtaposed at the one side part. Said marker 323 is formed at positions corresponding to two indexes 42, which are to be located when the lamp clip 32 is accurately disposed at the chassis 11.

The marker 333 is formed at one corner part of four corner parts of the base 331 of the lamp clip 33 so as to pierce from the front face of the base 331 to the reverse face and, in particular, is one triangular notch part (recess). Said marker 333 is formed at a position corresponding to the index 43, which is to be located when the lamp clip 33 is accurately disposed at the chassis 11.

The marker 343 is formed at two corner parts of four corner parts of the base 341 of the lamp clip 34 so as to pierce from the front face of the base 341 to the reverse face and, in particular, is a total of two triangular notch parts (recesses), one being located at one corner part and the other being located at the other corner part. Said marker 343 is formed at positions corresponding to two indexes 44, which are to be located when the lamp clip 34 is accurately disposed at the chassis 11.

Although the markers 313, 323, 333 and 343 which are notch parts (recesses) are formed simultaneously when the lamp clips 31, 32, 33 and 34 are integrally molded in the present embodiment, the markers 313, 323, 333 and 343 may be formed by notching the bases 311, 321, 331 and 341 properly after molding the bases 311, 321, 331 and 341 to have a rectangular shape.

Next, the arrangement procedure of the lamp clips 31, 32, 33 and 34 will be explained.

The operator prepares the lamp clip 31 by using the marker 313, and locks the locking portions 314 and 314 of the lamp clip 31 at the lock holes 111 and 111 by using the marker 313 and the index 41 as shown in FIG. 4 so as to attach the lamp clip 31 to the chassis 11.

The operator also prepares the lamp clip 32 by using the marker 323 and attaches the lamp clip 32 to the lock holes 112 and 112 by using the marker 323 and the index 42.

When the lamp clips 31 and 32 are arranged accurately, the rectangular index 41 is visible from the rectangular marker 313 and the index 42 is visible from the marker 323 as shown in FIG. 5.

Similarly, the operator prepares the lamp clip 33 by using the marker 333 and attaches the lamp clip 33 to the lock holes 113 and 113 by using the marker 333 and the index 43 as shown in FIG. 4.

The operator also prepares the lamp clip 34 by using the marker 343 and attaches the lamp clip 34 to the lock holes 114 and 114 by using the marker 343 and the index 44.

When the lamp clips 33 and 34 are arranged accurately, the circular index 43 is visible from the triangular marker 333 and the index 44 is visible from the marker 343 as shown in FIG. 6.

In the illuminant device 1 having the above structure, a combination of two adjacent lamps 21 and 22, a combination of the lamps 23 and 24, a combination of the lamps 25 and 26, and a combination of the lamps 27 and 28 are respectively held by one lamp clip 31 to 34.

Accordingly, the number of lamp clips 31 to 34 provided in the illuminant device 1 decreases in comparison with a case where the lamps 21 to 28 are held one by one (eight) and, furthermore, the number of working steps for holding the lamps 21 to 28 decreases.

Moreover, since accurate lamp clips 31 to 34 corresponding to the lamps 21 to 28 are attached easily, convenience for the operator is enhanced by simple means of forming the markers 313, 323, 333 and 343 and the indexes 41, 42, 43 and 44, and the performance, quality or the like of the illuminant device 1 is enhanced easily.

If an incorrect lamp clip 31-34 is attached to a lamp 21-28 or, for example, if a lamp clip 34 is attached to the lamps 21 and 22, it becomes difficult to hold the lamps 21 and 22 since the separation distance between the holding portions 342 and 342 of the lamp clip 34 is different from the pitch of the lamps 21 and 22.

It should be noted that holes which pierce the bases 311, 321, 331 and 341 (from the front face to the reverse face) may be formed instead of the markers 313, 323, 333 and 343 which are notch parts. In this case, the operator also can see indexes formed at the chassis 11 through said holes when the lamp clips 31 to 34 are disposed at accurate positions.

Moreover, convex parts, characters, marks or the like formed at the lamp clips 31 to 34 may be used as the markers instead of the notch parts or holes.

Furthermore, each lamp clip may be constructed to have three or more holding portions spaced from each other in the juxtaposition direction of the lamps.

Embodiment 2

Figure 11:
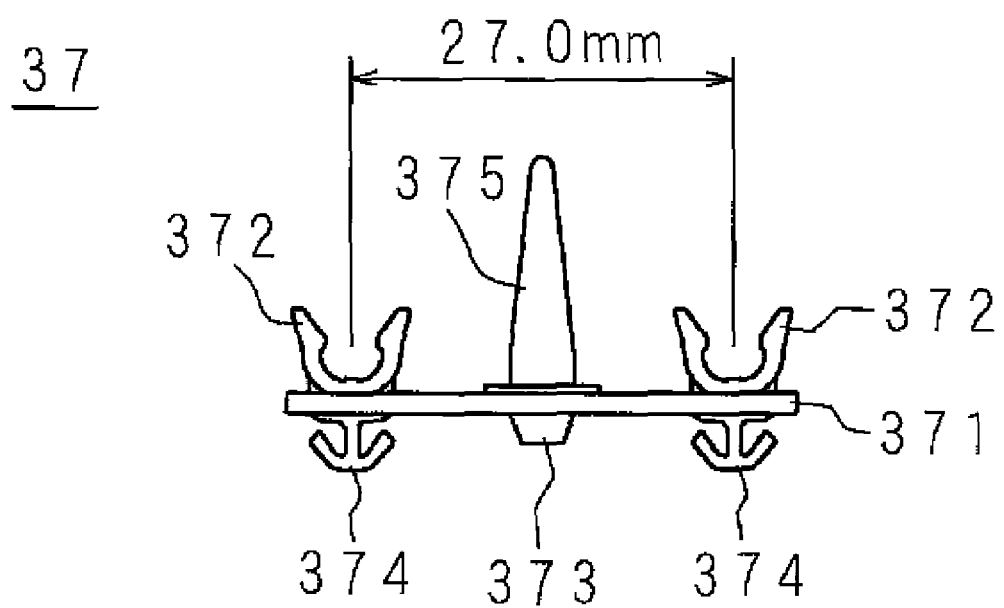
FIG. 11 is a side view for showing the structure of yet another lamp clip provided in an illuminant device according to Embodiment 2 of the present invention
Figure 12:
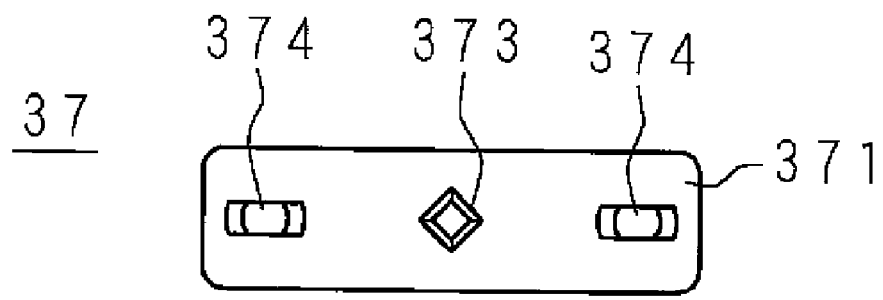
FIG. 12 is a bottom view for showing the structure of yet another lamp clip provided in an illuminant device according to Embodiment 2 of the present invention
Figure 13:
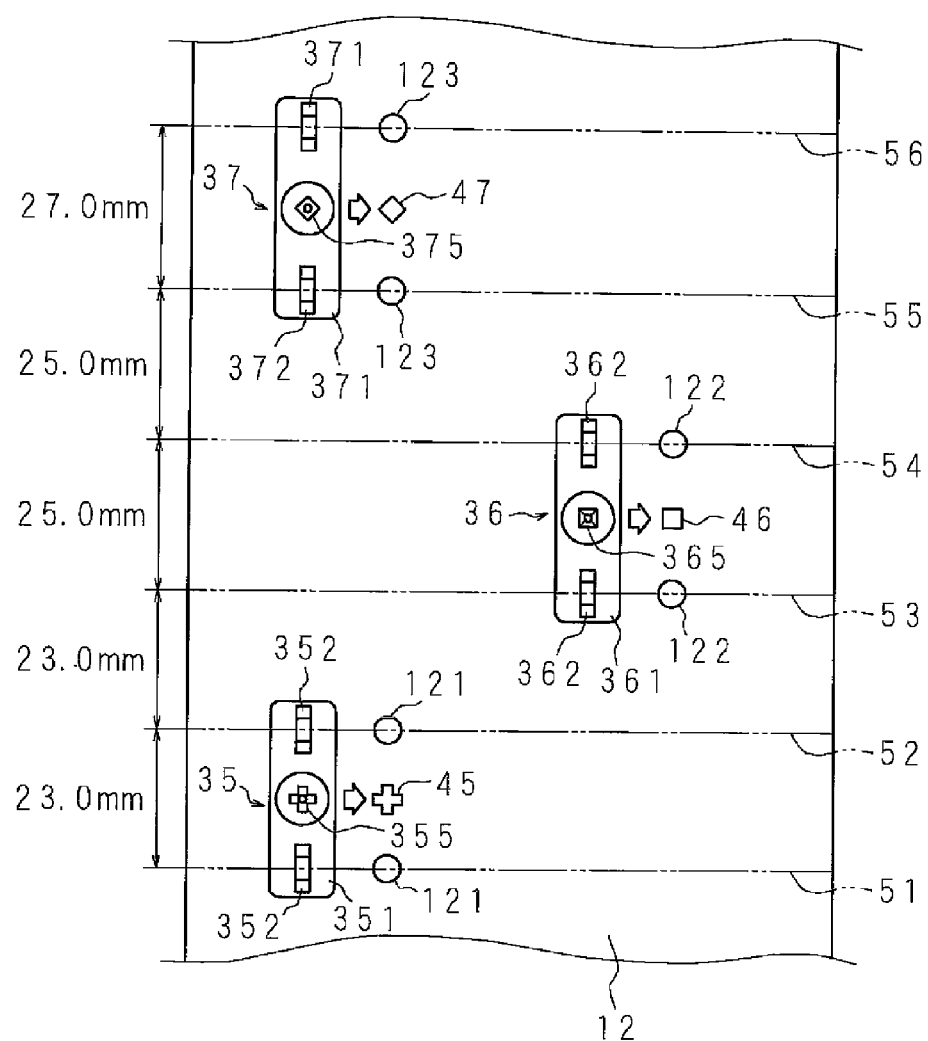
FIG. 13 is a partial schematic front view of an illuminant device for showing the arrangement procedure of lamp clips

FIGS. 7 and 8, FIGS. 9 and 10, and FIGS. 11 and 12 are side views and bottom views for showing the structure of lamp clips 35, 36 and 37 provided in an illuminant device according to Embodiment 2 of the present invention, and FIG. 13 is a partial schematic plan view of an illuminant device for showing the arrangement procedure of the lamp clips 35, 36 and 37. In FIG. 13, positions where lamps 51 to 56 are disposed are shown in long dashed double-short dashed line.

An illuminant device according to the present embodiment has a structure similar to that of the illuminant device 1 according to Embodiment 1, and lamp clips 35, 36 and 37 correspond to the lamp clips 31 to 34 of Embodiment 1 and lamps 51 to 56 correspond to the lamps 21 to 28 of Embodiment 1, for example. Accordingly, the following description will mainly explain differences from the illuminant device 1 according to Embodiment 1.

As shown in FIG. 13, the illuminant device comprises a chassis 12 which functions as a mounting plate where the lamps 51 to 56 are attached, and the chassis 12 corresponds to the chassis 11 of Embodiment 1.

The lamps 51 to 56 are juxtaposed in this order parallel to each other in such a manner that the pitch alternates between increase and maintenance from a central part of the illuminant device upward and downward to an upper end part.

In particular, the lamp 51 is disposed at a central part of the illuminant device upward and downward, the lamp 52 is disposed above the lamp 51 with a pitch of 23.0 mm, the lamp 53 is disposed above the lamp 52 with a pitch of 23.0 mm similarly, the lamp 54 is disposed above the lamp 53 with a pitch of 25.0 mm, and the lamp 55 is disposed above the lamp 54 with a pitch of 25.0 mm similarly.

Similarly, the lamp 56 is disposed above the lamp 55 with a pitch of 27.0 mm, a lamp which is not illustrated is disposed above the lamp 56 with a pitch of 27.0 mm similarly, and two lamps which are not illustrated are further disposed above said lamp respectively with a pitch of 29.0 mm.

As described above, the lamps 51 to 56 are disposed densely at a central part upward and downward and thinly at end parts upward and downward. The juxtaposition pitch of the lamps 51 to 56 correspond to the separation distance between long dashed double-short dashed lines shown in FIG. 13.

Furthermore, intermediate parts of the lamps 51 and 52 are held by one or two lamp clip(s) 35. Similarly, intermediate parts of the respective lamps 53 and 54 and lamps 55 and 56 are held by one or two lamp clip(s) 36 and 37.

It should be noted that a lamp clip 38 shown in Embodiment 3 may be used for two lamps disposed with a juxtaposition pitch of 29.0 mm.

Illustrated in FIG. 13 is the procedure for holding one position of each of intermediate parts of the respective lamps 51 to 56 with a total of three lamp clips 35, 36 and 37.

As shown in FIGS. 7 to 13, the respective lamp clips 35, 36 and 37 comprise bases 351, 361 and 371, holding portions 352, 352, 362, 362, 372 and 372, and locking portions 354, 354, 364, 364, 374 and 374. Said members correspond to the base 311, the holding portions 312 and 312, and the locking portions 314 and 314 provided in the lamp clip 31 of Embodiment 1.

Here, the separation distance between the holding portions 352 and 352 is 23.0 mm, the separation distance between the holding portions 362 and 362 is 25.0 mm, and the separation distance between the holding portions 372 and 372 is 27.0 mm.

Figure 7:
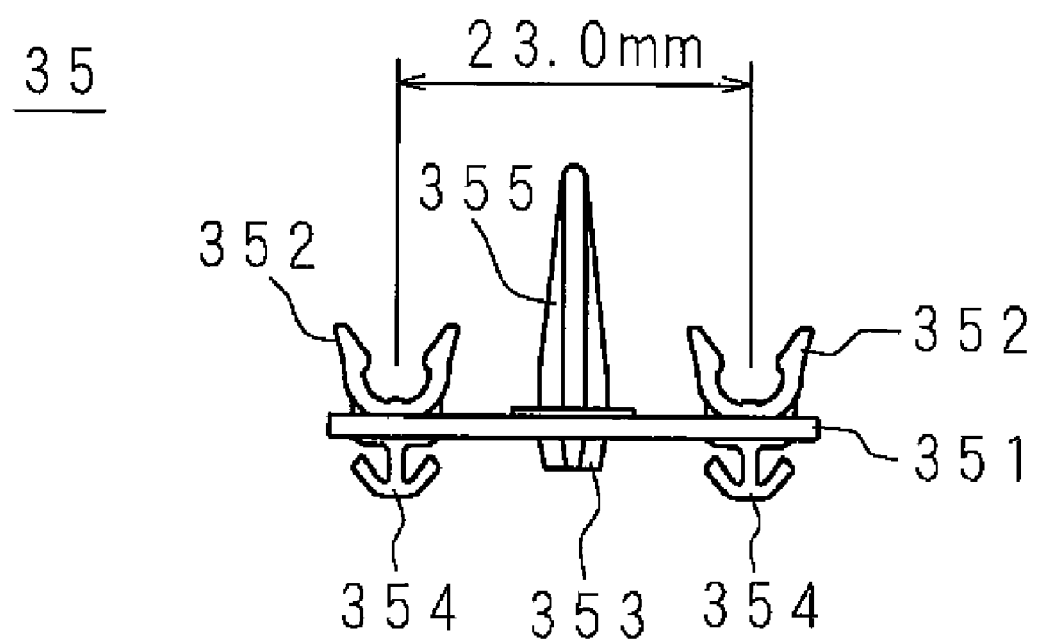
FIG. 7 is a side view for showing the structure of a lamp clip provided in an illuminant device according to Embodiment 2 of the present invention

As shown in FIGS. 7, 8 and 13, a front face marker 355 is integrally formed to project from a central part between the holding portions 352 and 352 on one face (front face) of the base 351 of the lamp clip 35, and a reverse face marker 353 is integrally formed to project from a central part between the locking portions 354 and 354 on the other face (reverse face) of the base 351.

The shape and the formation position of the front face marker 355 at the front face of the base 351 correspond to those of the reverse face marker 353 at the reverse face of the base 351 and, in particular, the reverse face marker 353 and the front face marker 355 are convex parts respectively having a cross-shape in a plan view.

Figure 9:
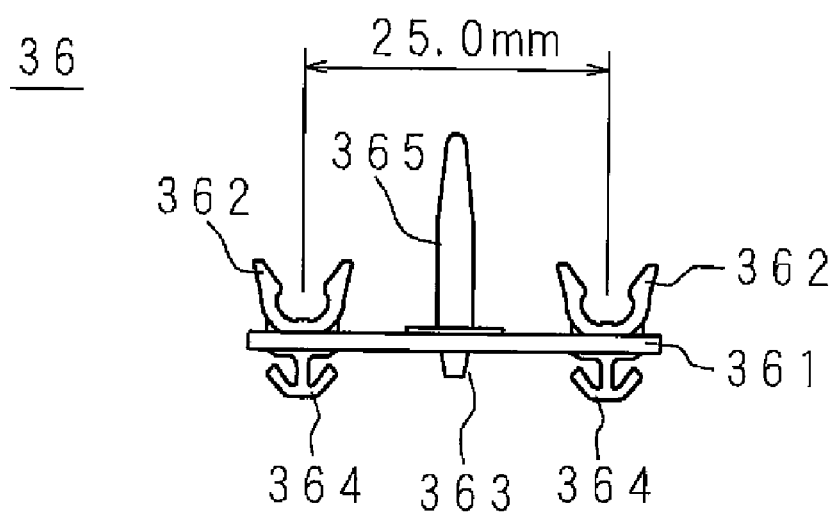
FIG. 9 is a side view for showing the structure of another lamp clip provided in an illuminant device according to Embodiment 2 of the present invention
Figure 10:
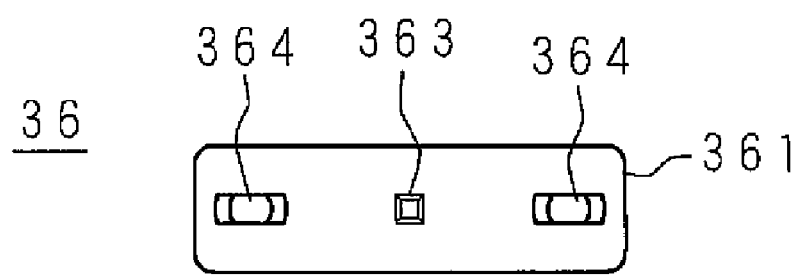
FIG. 10 is a bottom view for showing the structure of another lamp clip provided in an illuminant device according to Embodiment 2 of the present invention

Similarly, as shown in FIGS. 9, 10 and 13, a front face marker 365 is integrally formed to project from a central part between the holding portions 362 and 362 on one face (front face) of the base 361 of the lamp clip 36 and a reverse face marker 363 is integrally formed to project from a central part between the locking portions 364 and 364 on the other face (reverse face) of the base 361.

The front face marker 365 at the front face of the base 361 corresponds to the reverse face marker 363 at the reverse face of the base 361 and, in particular, the reverse face marker 363 and the front face marker 365 are convex parts respectively having a square-shape in a plan view.

Also similarly, as shown in FIGS. 11, 12 and 13, a front face marker 375 is integrally formed to project from a central part between the holding portions 372 and 372 on one face (front face) of the base 371 of the lamp clip 37 and a reverse face marker 373 is integrally formed to project from a central part between the locking portions 374 and 374 on the other face (reverse face) of the base 371.

The front face marker 375 at the front face of the base 371 corresponds to the reverse face marker 373 at the reverse face of the base 371 and, in particular, the reverse face marker 373 and the front face marker 375 are convex parts respectively having a rhomboid-shape in a plan view The reverse face markers 353, 363 and 373 having the above structure are markers of types different from each other and the front face markers 355, 365 and 375 respectively corresponding to said reverse face markers 353, 363 and 373 are also markers of types different from each other.

Lock holes 121, 121, 122, 122, 123 and 123 of the chassis 12 to which the lamp clips 35, 36 and 37 should be attached are formed at positions corresponding to the back of the lamps 51 to 56 as shown in FIG. 13. Said lock holes correspond to the lock holes 111, 111, 112, 112, 113, 113, 114 and 114 of the chassis 11 to which the lamp clips 31, 32, 33 and 34 of Embodiment 1 should be attached.

Moreover, indexes 45, 46 and 47 indicative of the locations of the respective lamp clips 35, 36 and 37 are formed at the chassis 12. The respective indexes 45, 46 and 47 are indexes of types different from each other and made by boring a hole or a pore at the chassis 12.

The index 45 is formed at a central part between the lock holes 121 and 121 related to the lamps 51 and 52, and is a cross-shaped concave part, which can correspond to the reverse face marker 353 that is a convex part at the reverse face of the base 351 of the lamp clip 35 when the lamp clip 35 is attached to the lock holes 121 and 121.

Similarly, the index 46 is formed at a central part between the lock holes 122 and 122 related to the lamps 53 and 54, and is a square-shaped concave part, which can correspond to the reverse face marker 363 that is a convex part at the reverse face of the base 361 of the lamp clip 36 when the lamp clip 36 is attached to the lock holes 122 and 122.

Also similarly, the index 47 is formed at a central part between the lock holes 123 and 123 related to the lamps 55 and 56, and is a rhomboid-shaped concave part, which can correspond to the reverse face marker 373 that is a convex part at the reverse face of the base 371 of the lamp clip 37 when the lamp clip 37 is attached to the lock holes 123 and 123.

The following description will explain the arrangement procedure of the lamp clips 35, 36 and 37.

The operator prepares the lamp clip 35 by using the front face marker 355 and locks the locking portions 354 and 354 of the lamp clip 35 at the lock holes 121 and 121 by using the front face marker 355 and the index 45 as shown in FIG. 13, with the reverse face marker 353 shown in FIGS. 7 and 8 corresponding to the index 45 shown in FIG. 13 simultaneously, so as to attach the lamp clip 35 to the chassis 12.

Since the shapes and the formation positions of the front face marker 355 and the reverse face marker 353 correspond to each other, the operator differentiates the lamp clip 35 by not checking the reverse face marker 353, which is difficult to check, but checking the front face marker 355, which is easy to check, and differentiates the lock holes 121 and 121, to which the lamp clip 35 should be attached, by using the index 45 corresponding to the reverse face marker 353, i.e., the index 45 corresponding to the front face marker 355.

Furthermore, when the reverse face marker 353 and the index 45 correspond to each other, it is checked that the lamp clip 35 is a correct member which should be attached to the lock holes 121 and 121.

If the reverse face marker 353 and the index 45 do not correspond to each other, it is clear that the lamp clip 35 is not a member which should be attached to the lock holes 121 and 121 or there is some problem such as deviation in the shape, size or the like of the lamp clip 35.

Similarly, the operator prepares the lamp clip 36 by using the front face marker 365 and locks the locking portions 364 and 364 of the lamp clip 36 at the lock holes 122 and 122 by using the front face marker 365 and the index 46 as shown in FIG. 13, with the reverse face marker 363 shown in FIGS. 9 and 10 corresponding to the index 46 shown in FIG. 13 simultaneously, so as to attach the lamp clip 36 to the chassis 12.

Also similarly, the operator prepares the lamp clip 37 by using the front face marker 375 and locks the locking portions 374 and 374 of the lamp clip 37 at the lock holes 123 and 123 by using the front face marker 375 and the index 47 as shown in FIG. 13, with the reverse face marker 373 shown in FIGS. 11 and 12 corresponding to the index 47 shown in FIG. 13 simultaneously, so as to attach the lamp clip 37 to the chassis 12.

When the respective lamp clips 35, 36 and 37 are arranged accurately, lowering of a reflection function of the chassis 12 due to formation of the indexes 45, 46 and 47 is depressed since the indexes 45, 46 and 47 are located behind the lamp clips 35, 36 and 37.

In the illuminant device having the above structure, a combination of two adjacent lamps 51 and 52, a combination of the lamps 53 and 54, and a combination of the lamps 55 and 56 are respectively held by one of the lamp clips 35, 36 and 37.

Accordingly, the number of lamp clips 35, 36 and 37 provided in the illuminant device decreases in comparison with a case where the lamps 51 to 56 are held one by one (six) and, furthermore, the number of working steps for holding the lamps 51 to 56 decreases.

Moreover, since the lamp clips 35, 36 and 37 corresponding to the lamps 51 to 56 are attached easily, convenience for the operator is enhanced by simple means of forming the front face markers 355, 365 and 375, the reverse face markers 353, 363 and 373, and the indexes 45, 46 and 47, and the performance, quality or the like of the illuminant device is enhanced easily.

It should be noted that the reverse face markers 353, 363 and 373 may be constructed as concave parts and the indexes 45, 46 and 47 may be constructed as convex parts. Moreover, the front face markers 355, 365 and 375 are not structurally limited to convex parts, and may be concave parts, characters, marks or the like.

Embodiment 3

Figure 18:
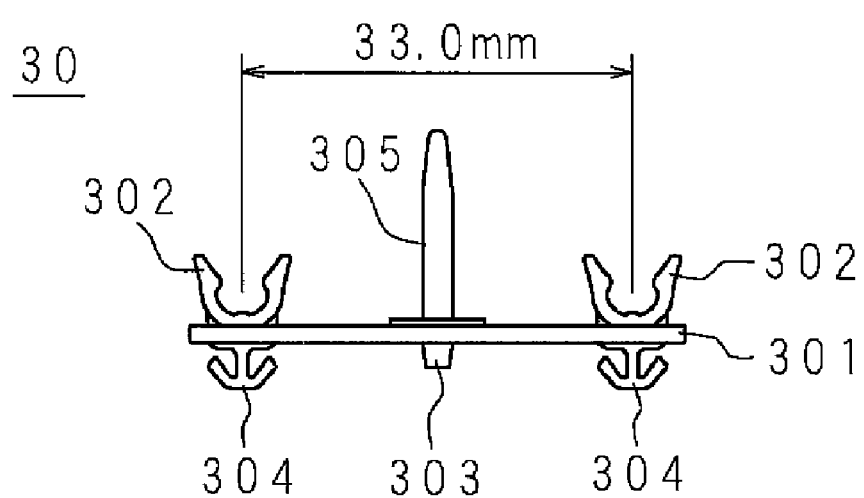
FIG. 18 is a side view for showing the structure of yet another lamp clip provided in an illuminant device according to Embodiment 3 of the present invention
Figure 19:
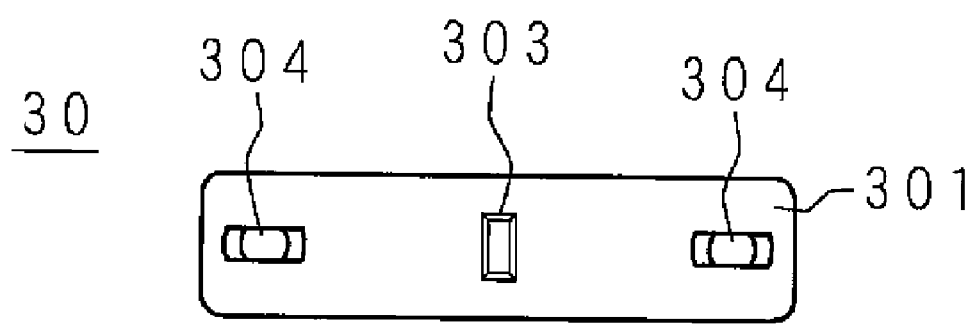
FIG. 19 is a bottom view for showing the structure of yet another lamp clip provided in an illuminant device according to Embodiment 3 of the present invention
Figure 20:
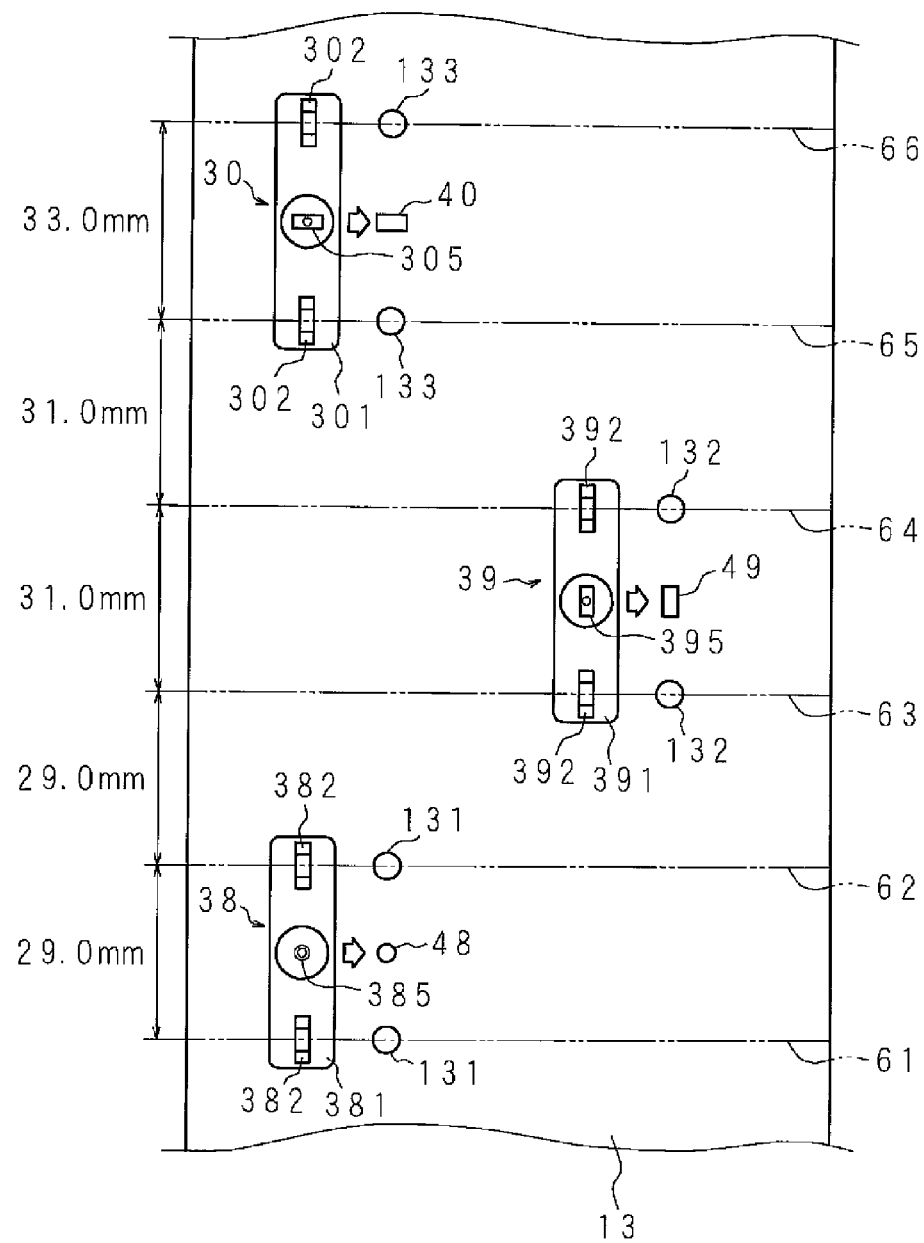
FIG. 20 is a partial schematic front view of an illuminant device for showing the arrangement procedure of lamp clips

FIGS. 14 and 15, FIGS. 16 and 17, and FIGS. 18 and 19 are side views and bottom views for showing the structure of lamp clips 38, 39 and 30 provided in an illuminant device according to Embodiment 3 of the present invention, and FIG. 20 is a partial schematic front view of an illuminant device for showing the arrangement procedure of the lamp clips 38, 39 and 30. In FIG. 20, positions where lamps 61 to 66 are disposed are shown in long dashed double-short dashed line.

An illuminant device according to the present embodiment is similar to the illuminant devices according to Embodiments 1 and 2, and lamp clips 38, 39 and 30 correspond to the lamp clips 35, 36 and 37 of Embodiment 2 and lamps 61 to 66 correspond to the lamps 51 to 56 of Embodiment 2, for example. Accordingly, the following description will mainly explain differences from the illuminant device according to Embodiment 2.

As shown in FIG. 20, the illuminant device comprises a chassis 13 which functions as a mounting plate where the lamps 61 to 66 are attached, and said chassis 13 corresponds to the chassis 12 of Embodiment 2.

The lamps 61 to 66 are juxtaposed in this order parallel to each other in such a manner that the pitch alternates between increase and maintenance from a central part of the illuminant device upward and downward to an upper end part.

In particular, two lamps which are not illustrated are disposed at a central part of the illuminant device upward and downward with a pitch of 27.0 mm, the lamp 61 is disposed above said lamps with a pitch of 27.0 mm similarly, the lamp 62 is disposed above the lamp 61 with a pitch of 29.0 mm, the lamp 63 is disposed above the lamp 62 with a pitch of 29.0 mm similarly, and the lamp 64 is disposed above the lamp 63 with a pitch of 31.0 mm.

Similarly, the lamp 65 is disposed above the lamp 64 with a pitch of 31.0 mm similarly, the lamp 66 is disposed above the lamp 65 with a pitch of 33.0 mm, and a lamp which is not illustrated is further disposed above said lamp with a pitch of 33.0 mm similarly.

As described above, the lamps 61 to 66 are disposed densely at a central part upward and downward and thinly at end parts upward and downward. The juxtaposition pitch of the lamps 61 to 66 corresponds to the separation distance between long dashed double-short dashed lines shown in FIG. 20.

Furthermore, intermediate parts of the lamps 61 and 62 are held by one or two lamp clip(s) 38. Similarly, intermediate parts of the respective lamps 63 and 64 and lamps 65 and 66 are held by one or two lamp clip(s) 39 and 30.

It should be noted that the lamp clip 37 shown in Embodiment 2 may be used for the two lamps disposed with a juxtaposition pitch of 27.0 mm.

Illustrated in FIG. 20 is the procedure for holding one position of each of intermediate parts of the respective lamps 61 to 66 with a total of three lamp clips 38, 39 and 30.

As shown in FIGS. 14 to 20, the respective lamp clips 38, 39 and 30 comprise bases 381, 391 and 301, holding portions 382, 382, 392, 392, 302 and 302, and locking portions 384, 384, 394, 394, 304 and 304. Said members correspond to the base 371, the holding portions 372 and 372, and the locking portions 374 and 374 provided in the lamp clip 37 of Embodiment 2, for example.

Here, the separation distance between the holding portions 382 and 382 is 29.0 mm, the separation distance between the holding portions 392 and 392 is 31.0 mm, and the separation distance between the holding portions 302 and 302 is 33.0 mm.

Figure 14:
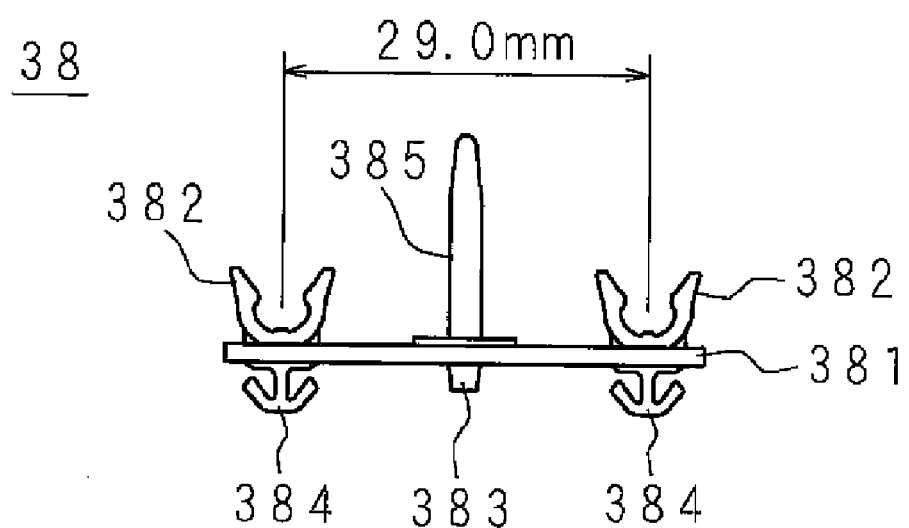
FIG. 14 is a side view for showing the structure of a lamp clip provided in an illuminant device according to Embodiment 3 of the present invention
Figure 15:
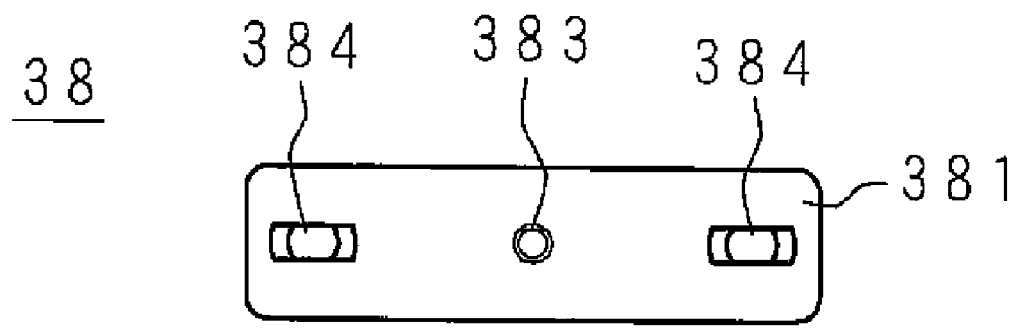
FIG. 15 is a bottom view for showing the structure of a lamp clip provided in an illuminant device according to Embodiment 3 of the present invention

As shown in FIGS. 14, 15 and 20, a front face marker 385 is integrally formed to project from a central part between the holding portions 382 and 382 on one face (front face) of the base 381 of the lamp clip 38, and a reverse face marker 383 is integrally formed to project from a central part between the locking portions 384 and 384 on the other face (reverse face) of the base 381.

The shape and the formation position of the front face marker 385 at the front face of the base 381 correspond to those of the reverse face marker 383 at the reverse face of the base 381 and, in particular, the reverse face marker 383 and the front face marker 385 are convex parts respectively having a circular shape in a plan view.

Figure 16:
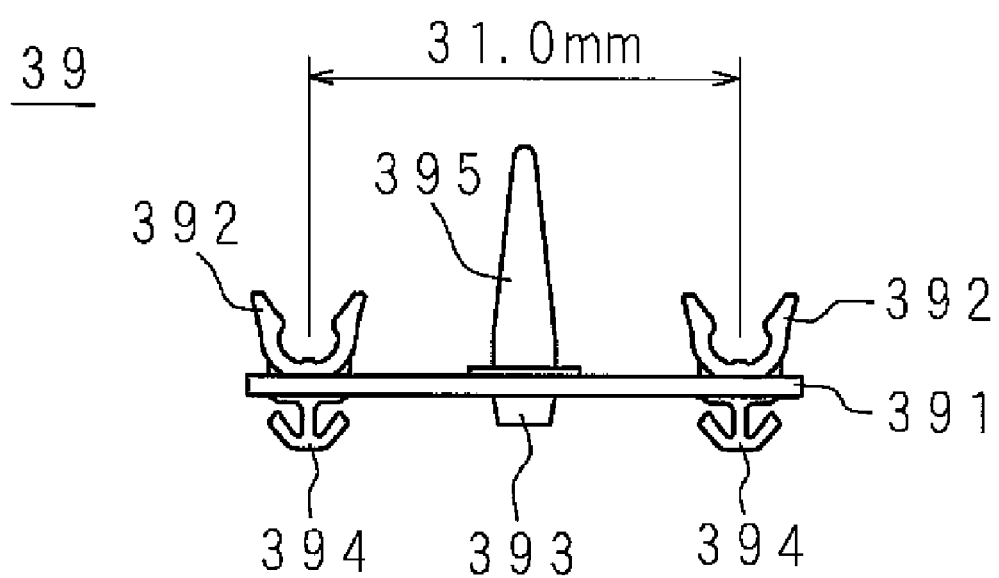
FIG. 16 is a side view for showing the structure of another lamp clip provided in an illuminant device according to Embodiment 3 of the present invention

Similarly, as shown in FIGS. 16, 17 and 20, a front face marker 395 is integrally formed to project from a central part between the holding portions 392 and 392 on one face (front face) of the base 391 of the lamp clip 39, and a reverse face marker 393 is integrally formed to project from a central part between the locking portions 394 and 394 on the other face (reverse face) of the base 391.

The front face marker 395 at the front face of the base 391 corresponds to the reverse face marker 393 at the reverse face of the base 391 and, in particular, the reverse face marker 393 and the front face marker 395 are convex parts respectively having a rectangular shape elongated in the separation direction of the holding portions 392 and 392 (or the separation direction of the locking portions 394 and 394) in a plan view.

Also similarly, as shown in FIGS. 18, 19 and 20, a front face marker 305 is integrally formed to project from a central part between the holding portions 302 and 302 on one face (front face) of the base 301 of the lamp clip 30, and a reverse face marker 303 is integrally formed to project from a central part between the locking portions 304 and 304 on the other face (reverse face) of the base 301.

The front face marker 305 at the front face of the base 301 corresponds to the reverse face marker 303 at the reverse face of the base 301 and, in particular, the reverse face marker 303 and the front face marker 305 are convex parts respectively having a rectangular shape elongated in a direction perpendicular to the separation direction of the holding portions 302 and 302 (or to the separation direction of the locking portions 304 and 304), i.e., a direction along the lamps 65 and 66 in a plan view.

The reverse face markers 383, 393 and 303 having the above structure are markers of types different from each other, and the front face markers 385, 395 and 305 respectively corresponding to said reverse face markers 383, 393 and 303 are also markers of types different from each other.

Lock holes 131, 131, 132, 132, 133 and 133 of the chassis 13 to which the lamp clips 38, 39 and 30 should be attached are formed at positions corresponding to the back of the lamps 61 to 66 as shown in FIG. 20. Said lock holes correspond to the lock holes 121, 121, 122, 122, 123 and 123 of the chassis 12 to which the lamp clips 35, 36 and 37 of Embodiment 2 should be attached.

Moreover, indexes 48, 49 and 40 indicative of the arrangement of the respective lamp clips 38, 39 and 30 are formed at the chassis 13. The respective indexes 48, 49 and 40 are indexes of types different from each other and made by boring a hole or a pore at the chassis 13.

The index 48 is formed at a central part between the lock holes 131 and 131 related to the lamps 61 and 62, and is a circular concave part, which can correspond to the reverse face marker 383 that is a convex part at the reverse face of the base 381 of the lamp clip 38 when the lamp clip 38 is attached to the lock holes 131 and 131.

Similarly, the index 49 is formed at a central part between the lock holes 132 and 132 related to the lamps 63 and 64, and is a rectangular concave part, which can correspond to the reverse face marker 393 that is a convex part at the reverse face of the base 391 of the lamp clip 39 when the lamp clip 39 is attached to the lock holes 132 and 132, i.e., a rectangular concave part elongated in the separation direction of the lock holes 132 and 132.

Also similarly, the index 40 is formed at a central part between the lock holes 133 and 133 related to the lamps 65 and 66, and is a rectangular concave part, which can correspond to the reverse face marker 303 that is a convex part at the reverse face of the base 301 of the lamp clip 30 when the lamp clip 30 is attached to the lock holes 133 and 133, i.e., a rectangular concave part elongated in a direction perpendicular to the separation direction of the lock holes 133 and 133.

The following description will explain the arrangement procedure of the lamp clips 38, 39 and 30.

The operator prepares the lamp clip 38 by using the front face marker 385 and locks the locking portions 384 and 384 of the lamp clip 38 at the lock holes 131 and 131 by using the front face marker 385 and the index 48 as shown in FIG. 20, with the reverse face marker 383 shown in FIGS. 14 and 15 corresponding to the index 48 shown in FIG. 20 simultaneously, so as to attach the lamp clip 38 to the chassis 13.

Similarly, the operator prepares the lamp clip 39 by using the front face marker 395 and locks the locking portions 394 and 394 of the lamp clip 39 at the lock holes 132 and 132 by using the front face marker 395 and the index 49 as shown in FIG. 20, with the reverse face marker 393 shown in FIGS. 16 and 17 corresponding to the index 49 shown in FIG. 20 simultaneously, so as to attach the lamp clip 39 to the chassis 13.

Also similarly, the operator prepares the lamp clip 30 by using the front face marker 305 and locks the locking portions 304 and 304 of the lamp clip 30 at the lock holes 133 and 133 by using the front face marker 305 and the index 40 as shown in FIG. 20, with the reverse face marker 303 shown in FIGS. 18 and 19 corresponding to the index 40 shown in FIG. 20 simultaneously, so as to attach the lamp clip 30 to the chassis 13.

When the respective lamp clips 38, 39 and 30 are arranged accurately, lowering of a reflection function of the chassis 13 due to formation of the indexes 48, 49 and 40 is depressed since the indexes 48, 49 and 40 are located behind the lamp clips 38, 39 and 30.

In the illuminant device having the above structure, a combination of two adjacent lamps 61 and 62, a combination of the lamps 63 and 64, and a combination of the lamps 65 and 66 are respectively held by one of the lamp clips 38, 39 and 30.

Accordingly, the number of lamp clips 38, 39 and 30 provided in the illuminant device decreases in comparison with a case where the lamps 61 to 66 are held one by one (six) and, furthermore, the number of working steps for holding the lamps 61 to 66 decreases.

Moreover, since the lamp clips 38, 39 and 30 corresponding to the lamps 61 to 66 are attached easily, convenience for the operator is enhanced by simple means of forming the front face markers 385, 395 and 305, the reverse face markers 383, 393 and 303, and the indexes 48, 49 and 40, and the performance, quality or the like of the illuminant device is enhanced easily.

It should be noted that the reverse face markers 383, 393 and 303 may be constructed as concave parts and the indexes 48, 49 and 40 may be constructed as convex parts. Moreover, the front face markers 385, 395 and 305 are not structurally limited to convex parts, and may be concave parts, characters, marks or the like.

Embodiment 4

Figure 21:
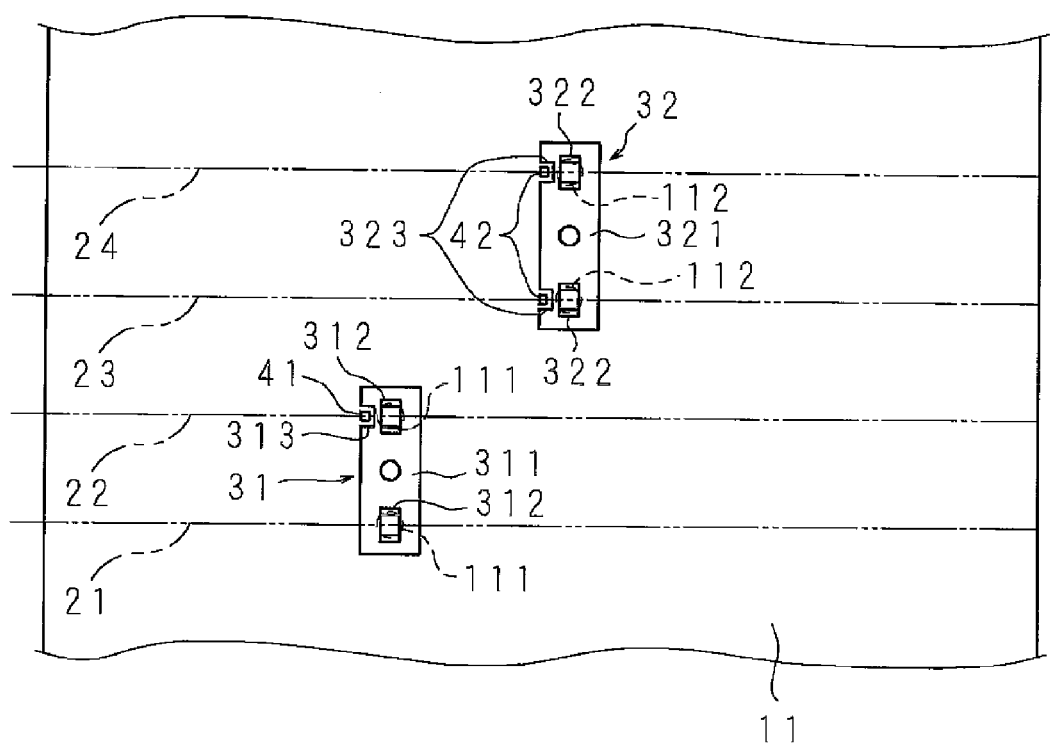
FIG. 21 is a partial schematic front view for showing a state where lamp clips of an illuminant device according to Embodiment 4 of the present invention are attached

FIG. 21 is a partial schematic front view for showing a state where lamp clips of an illuminant device according to Embodiment 4 of the present invention are attached.

An illuminant device according to the present embodiment is constructed by providing the indexes 40 to 49, which are to be provided at the chassis 11 to 13 as in Embodiment 1, at positions facing the outer surface of the lamps 21 to 28 so that the indexes 40 to 49 are located behind the lamps 21 to 28. Markers, such as the markers 313 and 355, of the lamp clips 30 to 39 are provided at positions facing the outer surface of the lamps 21 to 28 in correspondence to the locations of the indexes 40 to 49.

In the present embodiment, lowering of reflectivity due to the indexes 40 to 49 can be depressed and uneven luminance due to the indexes 40 to 49 can be eliminated.

Since other structures and functions are the same as those of Embodiments 1, 2 and 3, like codes are used to refer to like parts and detailed explanation thereof and explanation of functions and effects will be omitted.

Embodiment 5

Figure 22:
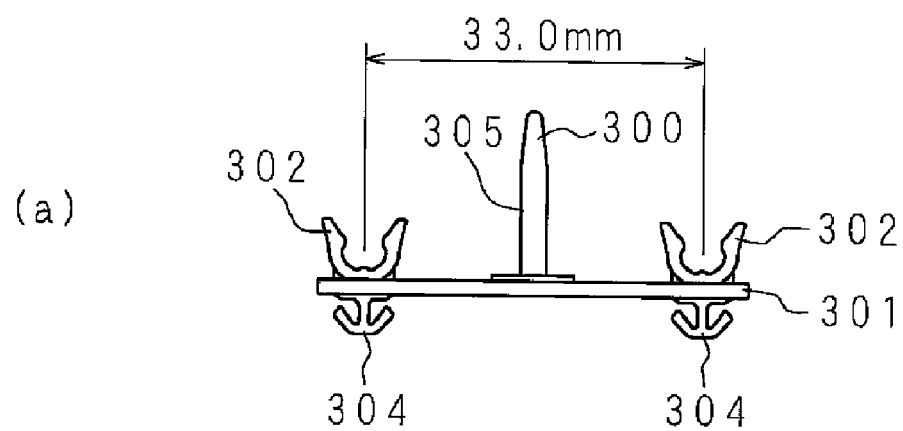
FIG. 22 is views for showing the structure of another lamp clip of an illuminant device according to Embodiment 5 of the present invention, wherein (a) is a side view and (b) is a bottom view
Figure 22:
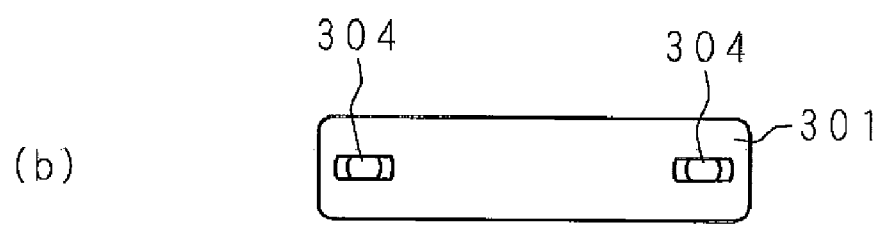

FIG. 22 shows the structure of another lamp clip of an illuminant device according to Embodiment 5 of the present invention, wherein (a) is a side view and (b) is a bottom view.

In an illuminant device according to the present embodiment, reverse face markers such as the reverse face marker 353 in Embodiment 3 are not provided and the indexes 40 to 49, which are to be provided at the chassis 11 to 13, are provided in correspondence to the front face marker 355 or the like provided at one face (front face) of a base such as the base 351 of the lamp clips 30 to 39.

A columnar projection 300 is integrally formed to project from a position between two facing holding portions, such as the holding portions 352 and 352, on one face (front face) of a base such as the base 351 of the lamp clips 30 to 39, and the respective columnar projections 300 have different sectional shapes so as to function as front face markers such as the front face marker 355. The columnar projections 300 are formed to have a length larger than that of the holding portions 352 and 352 or the like so as to depress deflection of the most flexible central part of an optical sheet in a display device in which the illuminant device is used. Front face markers such as the front face marker 355 may be provided at the columnar projections 300 or at a base such as the base 351. Moreover, front face markers such as the front face marker 355 may have a convex shape or a concave shape.

In the present embodiment, the lamp clips 30 to 39 are prepared by using the front face marker 355 or the like and the lamp clips 30 to 39 are attached to the chassis 11 to 13 by locking the locking portions of the lamp clips 30 to 39 at lock holes by using the front face marker 355 or the like and the indexes 40 to 49.

Since other structures and functions are the same as those of Embodiments 1, 2, 3 and 4, like codes are used to refer to like parts and detailed explanation thereof and explanation of functions and effects will be omitted.

In the embodiments explained above, a chassis 11 having a reflecting layer made of a reflecting sheet is prepared by boring the lock holes 111 to 114 through a reflecting sheet and providing indexes at the reflecting sheet. Moreover, a chassis 11 having a reflecting layer made of paint is prepared by boring the lock holes 111 to 114 through a paint face and providing indexes at the paint face.

The invention claimed is:

1. An illuminant device comprising:
at least four rod-shaped lamps;
a mounting plate where said lamps juxtaposed with different pitches are attached; and
a plurality of types of lamp clips which have a plurality of holding portions for holding a plurality of adjacent lamps and are provided at the mounting plate,
wherein an index indicative of a location of each lamp clip is provided at the mounting plate to have a shape different for each lamp clip,
a marker corresponding to the index is provided at each lamp clip, and wherein
each of the lamp clips comprises a plate-like base having one face where the holding portions are juxtaposed, and the marker is a recess or a hole which pierces from one face of the base to the other face.

2. The illuminant device according to claim 1, wherein the index is at a position facing the lamp.

3. An illuminant device comprising:
at least four rod-shaped lamps:
a mounting plate where said lamps juxtaposed with different pitches are attached; and
a plurality of types of lamp clips which have a plurality of holding portions for holding a plurality of adjacent lamps and are provided at the mounting plate,
wherein an index indicative of a location of each lamp clip is provided at the mounting plate to have a shape different for each lamp clip, and
a marker corresponding to the index is provided at each lamp clip, wherein
the index is a concave part (or a convex part),
each of the lamp clips comprises a plate-like base having one face where the holding portions are juxtaposed, and the marker is a convex part (or a concave part) provided at the other face of the base in correspondence to the concave part (or the convex part), and a marker corresponding to the convex part (or the concave part) is provided at the one face.

4. An illuminant device comprising:
at least four rod-shaped lamps;
a mounting plate where said lamps juxtaposed with different pitches are attached; and
a plurality of types of lamp clips which have a plurality of holding portions for holding a plurality of adjacent lamps and are provided at the mounting plate,
wherein an index indicative of a location of each lamp clip is provided at the mounting plate to have a shape different for each lamp clip, and
a marker corresponding to the index is provided at each lamp clip, and wherein
each of the lamp clips comprises a plate-like base having one face where the holding portions are juxtaposed, and the marker is provided at the one face.

5. The illuminant device according to claim 4, wherein
the base has a columnar projection which is provided to project from a position between the holding portions, and
the marker is provided at the columnar projection.

6. The illuminant device according to claim 4, wherein the index is disposed at a position facing the base.

7. A display device comprising:
a display panel having a display surface on a front side thereof; and
an illuminant device placed on a back side of said display panel,
wherein said illuminant device comprises:
at least four rod-shaped lamps;
a mounting plate where said lamps juxtaposed with different pitches are attached; and
a plurality of types of lamp clips which have a plurality of holding portions for holding a plurality of adjacent lamps and are provided at the mounting plate,
an index indicative of a location of each lamp clip is provided at the mounting plate to have a shape different for each lamp clip, and
a marker corresponding to the index is provided at each lamp clip, and wherein
each of the lamp clips comprises a plate-like base having one face where the holding portions are juxtaposed, and
the marker is a recess or a hole which pierces from one face of the base to the other face.

8. A display device comprising:
a display panel having a display surface on a front side thereof; and
an illuminant device placed on a back side of said display panel,
wherein said illuminant device comprises:
at least four rod-shaped lamps;
a mounting plate where said lamps juxtaposed with different pitches are attached; and
a plurality of types of lamp clips which have a plurality of holding portions for holding a plurality of adjacent lamps and are provided at the mounting plate,
an index indicative of a location of each lamp clip is provided at the mounting plate to have a shape different for each lamp clip, and
a marker corresponding to the index is provided at each lamp clip, wherein
the index is a concave part (or a convex part),
each of the lamp clips comprises a plate-like base having one face where the holding portions are juxtaposed, and
the marker is a convex part (or a concave part) provided at the other face of the base in correspondence to the concave part (or the convex part), and a marker corresponding to the convex part (or the concave part) is provided at the one face.

9. A display device comprising:
a display panel having a display surface on a front side thereof; and
an illuminant device placed on a back side of said display panel,
wherein said illuminant device comprises:
at least four rod-shaped lamps;
a mounting plate where said lamps juxtaposed with different pitches are attached; and
a plurality of types of lamp clips which have a plurality of holding portions for holding a plurality of adjacent lamps and are provided at the mounting plate,
an index indicative of a location of each lamp clip is provided at the mounting plate to have a shape different for each lamp clip, and
a marker corresponding to the index is provided at each lamp clip, wherein
each of the lamp clips comprises a plate-like base having one face where the holding portions are juxtaposed, and
the marker is provided at the one face.

* * * * *